(12) United States Patent
Nishimura et al.

(10) Patent No.: US 12,022,004 B2
(45) Date of Patent: Jun. 25, 2024

(54) TERMINAL REGISTRATION SYSTEM AND TERMINAL REGISTRATION METHOD

(71) Applicant: Nippon Telegraph and Telephone Corporation, Tokyo (JP)

(72) Inventors: Hideo Nishimura, Tokyo (JP); Takao Yamashita, Tokyo (JP); Yasuhiko Yoshimura, Tokyo (JP); Satoru Furukawa, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 34 days.

(21) Appl. No.: 17/824,670

(22) Filed: May 25, 2022

(65) Prior Publication Data

US 2022/0286297 A1 Sep. 8, 2022

Related U.S. Application Data

(62) Division of application No. 16/964,806, filed as application No. PCT/JP2019/004088 on Feb. 5, 2019, now Pat. No. 11,483,159.

(30) Foreign Application Priority Data

Feb. 6, 2018 (JP) .................................. 2018-018867

(51) Int. Cl.
*H04L 9/32* (2006.01)
*G06F 21/32* (2013.01)

(52) U.S. Cl.
CPC ............ *H04L 9/3247* (2013.01); *G06F 21/32* (2013.01); *H04L 9/3271* (2013.01)

(58) Field of Classification Search
None
See application file for complete search history.

(56) References Cited

U.S. PATENT DOCUMENTS 9,294,274 B2  3/2016 Smith
11,483,159 B2 * 10/2022 Nishimura .............. G06F 21/32
(Continued)

FOREIGN PATENT DOCUMENTS

JP       2017152877       8/2017

OTHER PUBLICATIONS

Fidoalliance.org, [online], "FIDO 2.0: Client to Authenticator Protocol," Oct. 19, 2016, retrieved on Dec. 20, 2017, retrieved from URL<https://fidoalliance.org/specs/fido-v2.0-rd-20161004/fido-client-to-authenticator-protocol-v2.0-rd-20161004.html>, 24 pages.

(Continued)

*Primary Examiner* — Benjamin E Lanier
(74) *Attorney, Agent, or Firm* — Fish & Richardson P.C.

(57) ABSTRACT

To provide a terminal registration system and a terminal registration method for improving user convenience in registration of a new terminal to a plurality of service sites. The registered terminal 1 includes an Authenticator 10 including service site list information 110 that associates private keys and URLs for access to service sites with each other. A Registration Manager 100 acquires the service site list information 110 from the Authenticator 10 of the registered terminal 1. Then, the Registration Manager 100 performs FIDO authentication for a registration target service site using a private key of the registered terminal 1, on the basis of the acquired service site list information 110, and performs Registration of a newly generated cryptographic key at the new terminal 2.

6 Claims, 12 Drawing Sheets

(56) References Cited

U.S. PATENT DOCUMENTS

2014/0289833 A1  9/2014  Briceno et al.
2015/0257004 A1  9/2015  Shanmugam et al.

OTHER PUBLICATIONS

Fidoalliance.org, [online], "Simpler, Stronger Authentication—FIDO is the World's Largest Ecosystem for Standards-Based, Interoperable Authentication," 2017, retrieved on Dec. 20, 2017, retrieved from URL<https://fidoalliance.org/>, 3 pages.
Nishimura et al., "A Study on Re-Registration of Authentication Key with Terminal Change in Mobile Terminal-Based Public Key Authentication System," Institute of Electronics, Information and Communication Engineers (IEICE), 2018, 117(460):69-74, 13 pages (with English Translation).
Nishimura et al., "A Study on Secure Sharing of Private Key for User Authentication Among Terminals Belonging to the Same Owner," Institute of Electronics, Information and Communication Engineers (IEICE), 2017, 116(485):449-454, 13 pages (with English Translation).
Takakuwa et al., "The Transfer Access Protocol—Moving to New Authenticators in the FIDO Ecosystem," Paul G. Allen School of Computer Science & Engineering, Jun. 2017, 16 pages.

\* cited by examiner

Fig. 14A
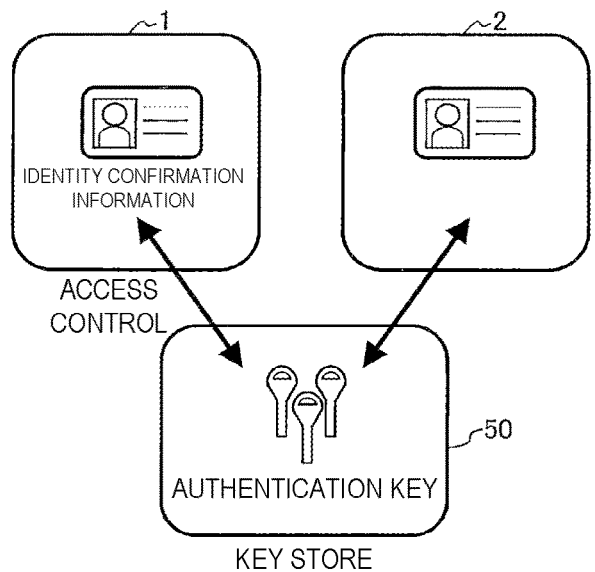
Fig. 14B
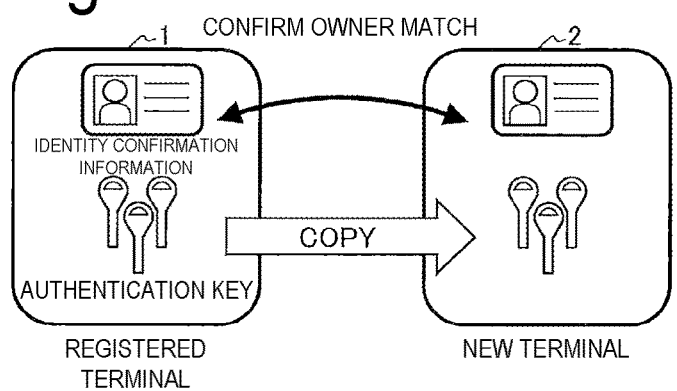
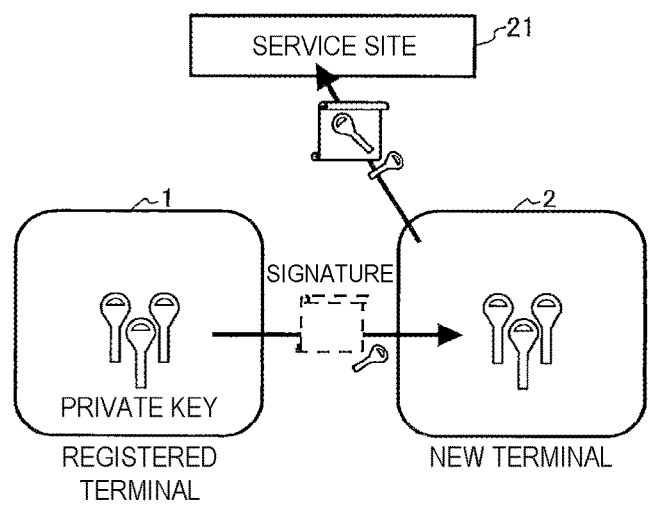
Fig. 15

TERMINAL REGISTRATION SYSTEM AND TERMINAL REGISTRATION METHOD

CROSS-REFERENCE TO RELATED APPLICATIONS

This application is divisional of U.S. application Ser. No. 16/964,806, filed on Jul. 24, 2020, which is a U.S. National Stage application under 35 U.S.C. § 371 of International Application No. PCT/JP2019/004088, having an International Filing Date of Feb. 5, 2019, which claims priority to Japanese Application Ser. No. 2018-018867, filed on Feb. 6, 2018, the disclosures of all of which are considered part of the disclosure of this application, and is incorporated in their entirety into this application

TECHNICAL FIELD

The present invention relates to a terminal registration system and a terminal registration method.

BACKGROUND ART

As a user authentication technique that replaces password authentication, there is a Web service user authentication technique using public key encryption known as Fast IDentity Online (FIDO), which is a de facto standard technology of the passwordless authentication (see NPL 1).

In FIDO, a different public key and private key pair is generated for each service, and the public key is placed on the service site side and the private key is locked in a terminal. The use of the private key (the signature in challenge and response authentication) is based on the assumption that biometric authentication is performed on the terminal, and the use of the private key takes place within an Authenticator, which prevents the private key from exiting the terminal so high security is achieved. In order to utilize FIDO authentication, Registration of a terminal needs to be performed on a service site in advance, and a public key of the terminal needs to be associated with the account. In standard technology, Registration is assumed to be performed after logging into an account with an authentication method other than FIDO.

Providing a plurality of authentication schemes is a large operation burden for a service operator and may also cause security holes. Thus, it is conceivable that only FIDO is used for the authentication after the Registration of the terminal is performed at the timing of account creation or the like. Consider a use case of associating another different terminal with the account in such an environment.

FIG. 9 is a diagram illustrating features of the standard technology (FIDO). As illustrated in FIG. 9, a terminal 1 and a terminal 2 are access controlled by biometric authentication or the like. The terminal 1 and the terminal 2, and a service site A21 and a service site B22 are authenticated by a FIDO protocol. The user accesses the service site A21 and the service site B22 using the terminal 1, and accesses the service site A21 and the service site B22 using the terminal 2. The service site A21 and the service site B22 register individual keys for each terminal. The terminal 1 and the terminal 2 generate individual key pairs for each site. Public keys 1-A and 2-A have been registered for the service site A21, and public keys 1-B and 2-B have been registered for the service site B22.

An Authenticator 10 (secure region) of the terminal 1 stores a private key 1-A paired with the public key 1-A and a private key 1-B paired with the public key 1-B. The Authenticator 10 (secure region) of the terminal 2 stores a private key 2-A paired with the public key 2-A and a private key 2-B paired with the public key 2-B.

FIG. 10 is a diagram illustrating registration of a new terminal with the standard technology (FIDO). A terminal 2 in FIG. 10 is a newly added terminal (hereinafter referred to as a new terminal 2) in addition to the terminal 1. The new terminal 2 results from addition or change of a terminal (for example, having two of a smartphone and a tablet terminal, or changing the terminal). In order to utilize FIDO authentication by the new terminal 2, Registration of a terminal needs to be performed on the service site in advance, and a public key of the terminal needs to be associated with the account.

As illustrated in FIG. 10, in a case where the new terminal 2 is used, there is no key in an Authenticator 10 of the new terminal 2, so it is necessary to generate a key pair again for each service to register.

A Client To Authenticator Protocol (CTAP) is defined as a protocol for performing FIDO authentication using an Authenticator external to a terminal (see NPL 2).

As methods to perform Registration of a key of a new terminal (the terminal 2 in FIG. 10) after performing FIDO authentication using a private key of a registered terminal (the terminal 1 in FIG. 10) and having logged in using the CTAP, technique 1 and technique 2 described below are conceivable.

FIG. 11 is a diagram illustrating technique 1 for Registration of a key of a new terminal using the CTAP. Note that CTAP, which is illustrated by a cylindrical shape in FIG. 11, indicates CTAP use, and Session, which is illustrated by a cylindrical shape, indicates that a Session has been established in the communication path.

Procedure 1: Access a registration target service site with a new terminal 2.

Procedure 2: The new terminal 2 logs in using a terminal 1 as an external Authenticator (using the CTAP) and performing FIDO authentication with a registered private key.

Procedure 3: Establish a communication session between the service site (the service site A21) and the new terminal 2.

Procedure 4: Register a key of an Authenticator of the new terminal 2 itself via the established communication session.

FIG. 12 is a diagram illustrating technique 2 for Registration of a new terminal key using the CTAP.

Procedure 1: Access a registration target service site (the service site A21) with a terminal 1.

Procedure 2: Log in by performing FIDO authentication with a registered private key in an Authenticator of the terminal 1 itself.

Procedure 3: Establish a communication session between the service site and the terminal 1

Procedure 4: The terminal 1 utilizes a new terminal 2 as an external Authenticator (using the CTAP) and registers a key of the external Authenticator (the new terminal 2).

CITATION LIST

Non Patent Literature

NPL 1: FIDO Alliance, "SIMPLER, STRONGER AUTHENTICATION", FIDO is the World's Largest Ecosystem for Standards-Based, Interoperable Authentication [online], [Searched on Jan. 20, 2018], Internet (https://fidoalliance.org/)

NPL 2: R. Lindemann, et al., FIDO 2.0: Client To Authenticator Protocol, FIDO Alliance Review Draft, 2016.

[Searched on Jan. 20, 2018], Internet (URL: https://fidoalliance.org/specs/fido-v2.0-rd-20161004/fido-client-to-authenticator-protocol-v2.0-rd-20161004.html)

NPL 3: Nishimura, et al., "Study on Secure Sharing of User Authentication Private Key between Terminals Belonging to Same Owner", The Institute of Electronics, Information and Communication Engineers Technical Research Report, IN2016-172, pp. 449-454, 2017.

NPL 4: A. Takakuwa, et al., "The Transfer Access Protocol-Moving to New Authenticators in the FIDO Ecosystem", Technical Report UW-CSE-17-06-01, The University of Washington, 2017.

SUMMARY OF THE INVENTION

Technical Problem

In a technique using the CTAP, which is a prior art, it is assumed to access a target service site to register a new terminal (the new terminal 2 in FIG. 11 and FIG. 12) individually and start registration processing.

In a case where multiple service sites are utilized by a registered terminal (the terminal 1 in FIG. 11 and FIG. 12), it is demanded that all of the service sites are set to be available by the terminal 2 at the timing when the terminal 2 is newly introduced.

FIG. 13 is a diagram illustrating a problem in achieving available states for multiple service sites. FIG. 13 illustrates an example of technique 1 of FIG. 11 but the same applies to technique 2 of FIG. 12.

As illustrated in FIG. 13, a registered terminal 1 utilizes a number of service sites (a service site A21, a service site B22, a service site C23, and a service site D24). An Authenticator 10 (secure region) of the terminal 1 stores a private key 1-A paired with a public key 1-A, a private key 1-B paired with a public key 1-B, a private key 1-C paired with a public key 1-C, and a private key 1-D paired with a public key 1-D. There is a demand to use all of the service sites at the timing when a terminal 2 is newly introduced. Thus, a user accesses (for example, via URL input, search site) respective target sites to start Registration. However, known techniques have problems as described below.

The user needs to actively access (URL input, page transitions through search engine, or the like) to each of service sites to perform Registration. This causes a problem that the work burden is increased depending on the number of service sites. (2) Registration of the new terminal 2 needs to be performed without exception for all service sites in use by the registered terminal 1. This causes a problem that the user has a burden to know all of the service sites in use.

The present invention is made in light of the foregoing, an object of the present invention is to provide a terminal registration system and a terminal registration method for improving user convenience in registration of a new terminal on a plurality of service sites.

Means for Solving the Problem

In order to solve the above-described problem, the invention according to claim 1 is a terminal registration system in which a plurality of terminals performing Fast IDentity Online (FIDO) authentication using private keys are communicatively connected to a plurality of service sites utilized by the plurality of terminals, and a new terminal is registered on a plurality of the service sites using a registered terminal, the registered terminal including service site list information that associates the private keys and URLs for access to the plurality of service sites with each other in an Authenticator, the terminal registration system including: a registration function unit configured to: acquire the service site list information to perform FIDO authentication for a registration target service site using a private key of the registered terminal, based on the service site list information; and perform Registration of a cryptographic key newly generated at the new terminal.

The invention according to claim 7 is a terminal registration method for a terminal registration system in which a plurality of terminals performing FIDO authentication using private keys are communicatively connected to a plurality of service sites utilized by the plurality of terminals, and a new terminal is registered on the plurality of service sites using a registered terminal, the registered terminal including service site list information that associates the private keys and URLs for access to the plurality of service sites with each other in an Authenticator, the terminal registration method including the steps of, performed by a registration function unit: acquiring the service site list information to perform FIDO authentication for a registration target service site using a private key of the registered terminal, based on the service site list information; and performing Registration of a cryptographic key newly generated at the new terminal.

In this way, in a case where a use case is to be supported in which a new terminal is registered using a registered terminal in a service site that performs FIDO authentication, Registration is performed by automatically accessing registration target service sites, based on the service site list information acquired by the registration function unit, so user convenience in terms of Registration on a plurality of service sites can be improved. The user does not have a burden of managing service sites on which the user wants to register when the user begins to use a new terminal. Furthermore, work burden on the user is reduced when the number of service sites increases.

The invention according to claim 2 is the terminal registration system according to claim 1, wherein the registration function unit is located on the registered terminal side, and the registration function unit logs in to registration target service sites for all private keys registered in the Authenticator of the registered terminal, and performs Registration using the new terminal as an external Authenticator by a CTAP.

With this configuration, registration results are displayed on the originally used registered terminal side, so the user can confirm the registration results on the familiar registered terminal side.

The invention according to claim 3 is the terminal registration system according to claim 1, wherein the registration function unit is located on the new terminal side, the registration function unit acquires the service site list information from the Authenticator of the registered terminal to perform FIDO authentication to log in to each service site using the registered terminal as an external Authenticator by the CTAP, based on the service site list information, and the new terminal performs Registration related to Authenticator of the new terminal in an established session.

With this configuration, registration results are displayed on the new terminal side, so the registration results can be confirmed on the side of the new terminal which the user is beginning to use.

The invention according to claim 4 is the terminal registration system according to claim 1, wherein the registration function unit is located on an external device different from the registered terminal and the new terminal, and the registration function unit acquires the service site list information from the Authenticator of the registered terminal to perform FIDO authentication to log in to each service site using the registered terminal as an external Authenticator, based on the service site list information, and subsequently, newly performs Registration using the new terminal as an external Authenticator.

With this configuration, the registration function unit is located on the external device side, making it possible to minimize functional configuration required on terminal sides.

The invention according to claim 5 is the terminal registration system according to claim 1, wherein the registration function unit notifies a user of a registration progress status for each service site.

With this configuration, the user can confirm the registration progress status for service sites (for example, the number of target sites, the number of registration completion, registration failure). Unauthorized sites can also be identified by specifying invalid sites.

The invention according to claim 6 is the terminal registration system according to claim 1, wherein the registration function unit performs retry control for performing a predetermined number of retries in a case where registration on each service site fails.

With this configuration, the likelihood of being connected can be increased by retry in a case where registration with a certain service site fails due to a communication failure or the like. By providing the number of retry times, it is possible to reduce access time in a case where the connectivity is low (or there is no connectivity).

Effects of the Invention

According to the present invention, a terminal registration system and a terminal registration method for improving user convenience can be provided in registration of a new terminal to a plurality of service sites.

BRIEF DESCRIPTION OF DRAWINGS

FIGS. 14A and 14B are diagrams illustrating a secure sharing technique for a private key, where FIG. 14A is a diagram illustrating a sharing technique using a centralized sharing scheme, and FIG. 14B is a diagram illustrating a sharing technique using a distributed sharing scheme.

FIG. 15 is a diagram illustrating a technique for improving convenience of reregistration.

DESCRIPTION OF EMBODIMENTS

Figure 1:
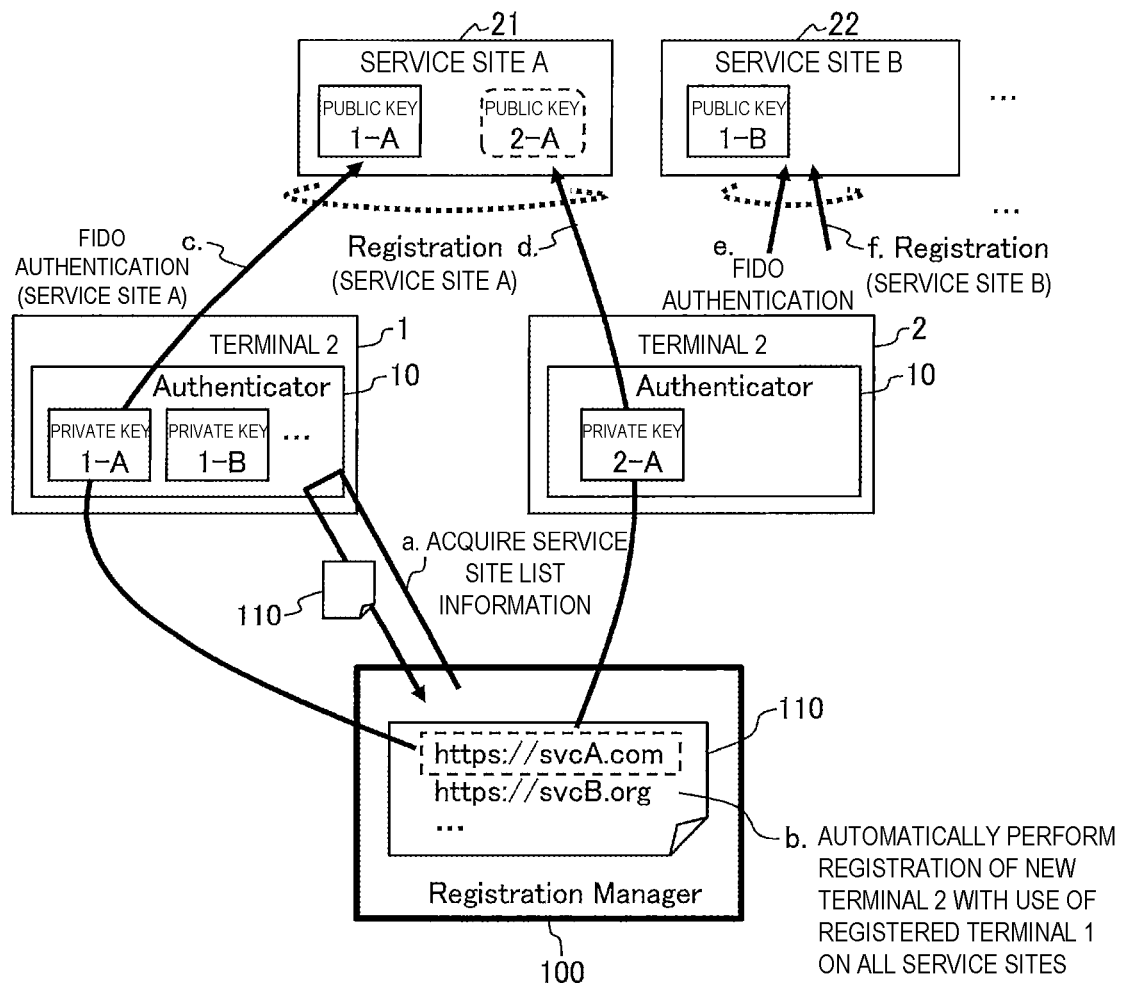
FIG. 1 is a diagram illustrating an overview of the present invention.

A terminal registration system and the like according to an embodiment of the present invention (hereinafter referred to as "the present embodiment") will be described below with reference to the drawings.

System Configuration and Processing Overview

First, the relationship between the present invention and the existing techniques will be described.

Secure Sharing Technique for Private Key

FIGS. 14A and 14B are diagrams illustrating a secure sharing technique for a private key, where FIG. 14A illustrates a sharing technique using a centralized sharing scheme, and FIG. 14B illustrates a sharing technique using a distributed sharing scheme. Techniques for securely sharing a private key between terminals on the basis of identity confirmation information have been proposed (see NPL 3).

As illustrated in FIG. 14A, in a centralized sharing scheme, terminals 1 and 2 store authentication keys in a key store 50. The terminals 1 and 2 access the key store 50 by performing access control on the basis of identity confirmation information, and shares the same keys stored in the key store 50.

As illustrated in FIG. 14B, in a distributed sharing scheme, key sharing of a registered terminal 1 and a new terminal 2 is performed. For example, the registered terminal 1 confirms owner match with the new terminal 2 on the basis of identity confirmation information, and copies authentication keys of the registered terminal 1 to the new terminal 2 in a case where the owner match is confirmed.

In both sharing techniques of the above-described centralized sharing scheme and the above-described distributed sharing scheme, FIDO authentication may be used without newly performing Registration of a new terminal. However, the FIDO specification is based on the assumption that a private key is locked in a terminal, and in order to use any of the aforementioned sharing techniques, a terminal that conforms to the FIDO standard specification cannot be used as it is, and a uniquely extended terminal needs to be used.

Technique for Improving Convenience of Reregistration

FIG. 15 is a diagram illustrating a technique for improving convenience of reregistration.

As illustrated in FIG. 15, a signature created with a private key of a registered terminal 1 is provided in advance to a new terminal 2. A technique has been proposed in which Registration of the new terminal 2 can be performed in this way at any timing and without user work (see NPL 4).

In accordance with the present technique, Registration is performed automatically (without user work) at the time of initial access to a service site 21 without the user actively accessing all service sites 21 and performing Registration operation in advance at the first time of the new terminal 2. Thus, there is no work burden on a user proportional to the number of service sites. However, the present technique requires expansion to the FIDO protocol to perform Registration automatically and also requires additional functionality to manage signature information on the new terminal 2. As in the case of FIGS. 14A and 14B above, in the present technique, a terminal that conforms to the FIDO standard specification cannot be used as is, and a uniquely extended terminal needs to be used.

The present invention improves user convenience for registration of a new terminal to a plurality of service sites using a registered terminal.

System Configuration and Processing Overview

FIG. 1 is a diagram illustrating an overview of the present invention. As illustrated in FIG. 1, a terminal registration system includes service site list information 110 stored by an Authenticator 10 of a registered terminal 1, and a Registration Manager 100 (registration function unit) serving as a function unit to perform Registration of a new terminal 2 to a plurality of service sites. The service site list information 110 is a list of URL for managing private keys and target site URLs (Uniform Resource Locators) in association with each other. The service site list information 110 is stored in the Authenticator 10 (authentication device) of the registered terminal 1.

The Registration Manager 100 controls both of the registered terminal 1 and the new terminal 2 as described below.

The Registration Manager 100 acquires, from the registered terminal 1, the service site list information 110 stored by the Authenticator 10 of the registered terminal 1 (see reference sign a in FIG. 1).

The Registration Manager 100 performs FIDO authentication for a registration target service site using a private key of the registered terminal 1, and performs Registration of a newly generated cryptographic key at the new terminal 2. The Registration Manager 100 performs the above-described Registration processing automatically for all sites of URLs stored in the service site list information 110.

For example, the Registration Manager 100 automatically performs registration of the new terminal 2 using the registered terminal 1 on the all service sites (a service site A21, a service site B22, . . . ) on the basis of the acquired service site list information 110 (see reference sign b in FIG. 1).

Here, the Registration Manager 100 also displays a registration progress status for a user, or performs retry control or the like at the time of failure due to communication failure, or the like (as described later in FIG. 8). In the example of FIG. 1, the Registration Manager 100 performs FIDO authentication on a registration target service A site using a private key 1-A of the registered terminal 1 (see reference sign c in FIG. 1). Then, the Registration Manager 100 performs Registration (registration processing) of the newly generated cryptographic key at the new terminal 2 (see reference sign d in FIG. 1).

The above is an example of automatically performing registration of the new terminal 2 using the registered terminal 1 with respect to the service site A21, but similar processing is performed for a service site B22 (see reference signs e and f in FIG. 1).

As described above, the Registration Manager 100 performs FIDO authentication for each registration target service site using the private key of the registered terminal 1 for all service sites, and performs Registration of the newly generated cryptographic key at the new terminal 2.

Note that the Registration Manager 100 may be located either on the registered terminal 1 side, on the new terminal 2 side, or external to the registered terminal 1 and the new terminal 2. An example of locating the Registration Manager 100 on the registered terminal 1 side is described in the first embodiment, an example of locating the Registration Manager 100 on the new terminal 2 side is described in the second embodiment, and an example of locating the Registration Manager 100 external to terminals is described in the third embodiment.

First Embodiment

A first embodiment is an example of locating the Registration Manager 100 on the registered terminal 1 side.

Figure 2:
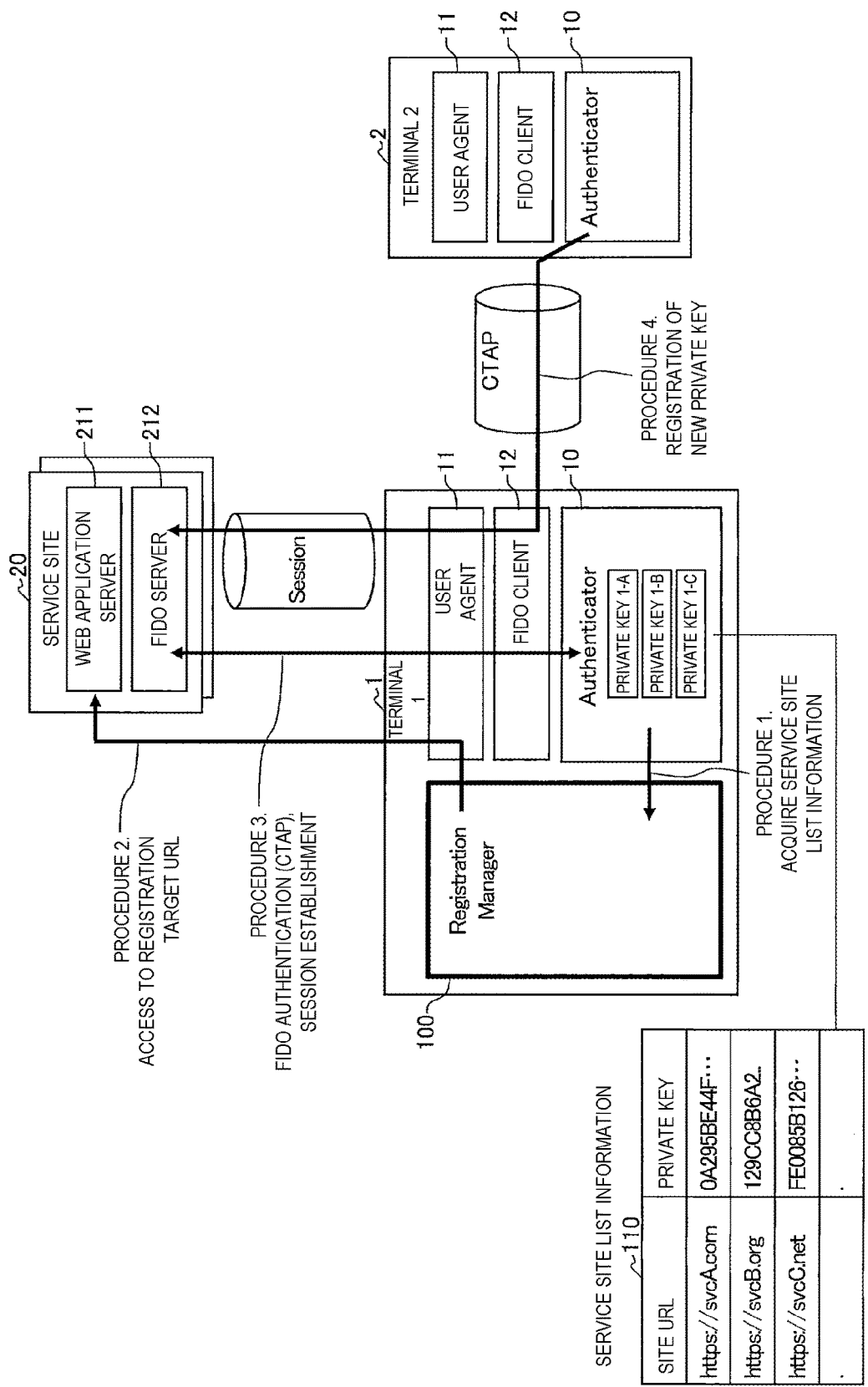
FIG. 2 is a configuration diagram illustrating a terminal registration system according to a first embodiment of the present invention.

FIG. 2 is a configuration diagram illustrating a terminal registration system according to the first embodiment of the present invention. Note that CTAP, which is illustrated by a cylindrical shape in FIG. 2, indicates CTAP use, and Session, which is illustrated by a cylindrical shape, indicates that a Session has been established in the communication path.

Overall Configuration of Terminal Registration System

As illustrated in FIG. 2, the terminal registration system according to the present embodiment includes, in addition to a registered terminal (a terminal 1) and a new terminal (a terminal 2), service sites 20 and a Domain Name System (DNS) server 30 (see FIG. 3) on the network. The registered terminal (the terminal 1), the new terminal (the terminal 2), the service site 20, and the DNS server 30 are connected by a communication network (not illustrated) and are capable of communicating with each other.

Service Site

Each service site 20 includes a Web application server 211 and a FIDO server 212. The Web application server 211 is a Web server having a software execution environment, a cooperative function, and the like. The Web application server 211 has a function to connect to and cooperate with the FIDO server 212 to perform complex processing. The Web application server 211 is a Web server operated by a service operator running an Electronic Commerce (EC) site, for example, and performs registration and authentication of a user using the service.

The FIDO server 212 is responsible for FIDO authentication, and only the portion that performs authentication in the Web application server 211 is separated and used as a library.

Configurations of Terminals 1 and 2

Each of the terminals 1 and 2 is an authentication terminal, and is, for example, a mobile terminal such as a smartphone, a mobile phone, and a tablet, a notebook or desktop PC, or one of various electronic devices. In the present embodiment, a smartphone is taken as an example.

Each of the terminals 1 and 2 logically includes a normal region, which is a region in which a normal application or the like operates, and a region inside an Authenticator 10 (secure region), which is a region managed not to be contaminated by malware or the like (a region that is managed so as not to be invaded fraudulently from the outside).

The normal region is an environment in which a general application program is executed. The normal region is provided with a user agent 11 and a FIDO client 12.

The Authenticator 10 is present in a region that is managed so as not to be invaded fraudulently from the outside, and biometric information (such as fingerprint information) is stored. The Authenticator 10 is executed in a privilege mode of Central Processing Unit (CPU) or Operating System (OS), and program calls or access to data by the Authenticator 10 is available only through specific programs or specific procedures.

The Authenticator 10 authenticates a key to perform challenge and response authentication. The Authenticator 10 also deals with a part of handling of keys, such as making a key available after performing biometric authentication. Specifically, the Authenticator 10 displays an authentication screen such as fingerprint authentication and authenticates a user. The Authenticator 10 also signs a random number or the like acquired from the service site 20 with a user private key and transmits the signed result to the service site 20.

The user agent 11 is a browser or the like for the user to access the Web application server 211 of the service site 20. The user agent 11 issues a key registration request and an authentication request by utilizing a Web service to the Web application server 211 of the service site 20.

The FIDO client 12 is paired with the FIDO server 212 of the service site 20, and transmits its user protocol to the FIDO server 212 (FIDO library) and exchanges authentication messages with the FIDO server 212.

The FIDO client 12 performs assembly of messages or assembly of protocols, while the Authenticator 10 deals with a part of handling of keys, out of assembly of messages or assembly of protocols performed by the FIDO client 12.

Authentication and Registration of FIDO

Authentication

The FIDO server 212 having received a request for "start of user authentication" from the Web application server 211 of the service site 20 transmits information, such as a self-generated random number, to the FIDO client 12 via the user agents 11 of the terminals 1 and 2. The FIDO client 12 having received the FIDO authentication request requests the Authenticator 10 for user registration. The Authenticator 10 displays an authentication screen such as fingerprint authentication and authenticates the user. In a case where the authentication is successful, the Authenticator 10 signs a random number or the like acquired from the Web application server 211 of the service site 20 with a private key and transmits the result to the FIDO server 212 of the service site 20. The FIDO server 212 verifies the received signature (authenticates the user) and returns the authentication result to the Web application server 211.

Registration

The FIDO server 212 having received the request for "start of user registration" from the Web application server 211 of the service site 20 transmits information, such as a self-generated random number, to the FIDO client 12 via the user agents 11 of the terminals 1 and 2. The FIDO client 12 having received the FIDO registration request requests the Authenticator 10 for user registration. The Authenticator 10 displays a registration screen of biometric information, such as a fingerprint, and allows the user to register biometric information. After completion of the registration, the Authenticator 10 generates a key pair of public key encryption and associates the key pair with the user. The Authenticator 10 also generates a signature with a private key of the Authenticator 10 in accordance with the public key, the random number acquired from the server, or the like, and transmits the signature via the FIDO client 12 to the FIDO server 212 of the service site 20. The FIDO server 212 verifies the received signature (validity conformation of the Authenticator), registers the public key of the user, and returns the result to the Web application server 211.

Terminal 1 (Registered Terminal)

The registered terminal 1 stores, in the Authenticator 10, a private key 1-A paired with a public key 1-A, a private key 1-B paired with a public key 1-B, a private key 1-C paired with a public key 1-C, and service site list information 110. The service site list information 110 manages private keys and target site URLs in association with each other. For example, as illustrated in FIG. 2, the service site list information 110 associates a private key "0A295BE44F . . . " with a site URL "https://svcA.com", a private key "129CC8B6A2 . . . " with a site URL "https://svcB.org", and a private key "FE0085B126 . . . " with a site URL "https://svcC.net".

The service site list information 110 may, in addition to association of private keys and target site URLs, use user names to be associated. In this way, a user with a plurality of user names can use the same URL or, conversely, can change combination of private keys and target site URLs for each user name.

Note that in known user authentication techniques, private keys and target site URLs have not been managed in association with each other.

Registration Manager 100

In the present embodiment, the Registration Manager 100 is located on the registered terminal 1 side.

The Registration Manager 100 performs Registration using the new terminal 2 as an external Authenticator by the CTAP, after logging in target service site, for all the private keys registered in the Authenticator 10 of the registered terminal 1.

A terminal registration method of the terminal registration system configured as described above will be described below.

Operation Overview

First, an operation overview of the terminal registration method of the terminal registration system is described.

As illustrated in FIG. 2, the Registration Manager 100 is located on the registered terminal 1 side.

Procedure 1: The Registration Manager 100 acquires the service site list information 110 of the registered terminal 1 from the Authenticator 10.

The Registration Manager 100 performs processing of following procedure 2 to procedure 4 for all URLs of the acquired service site list information 110.

Procedure 2: The Registration Manager 100 accesses the service site 20 of the registration target URL, based on the acquired service site list information 110.

Procedure 3: The Registration Manager 100 utilizes a private key registered in the internal Authenticator 10 of the registered terminal 1 to perform FIDO authentication for and log in to the target service site 20 and establishes a session.

Procedure 4: The new terminal 2 is used as an external Authenticator 10 by the CTAP to perform Registration of a private key.

A more detailed description will be given. The Registration Manager 100 learns that the registered terminal 1 has a private key of the service site list information 110 by acquiring the service site list information 110, but does not have means for presenting the private key to the service site 20. Seeing from the service site 20, in a case where the Registration Manager 100 of the registered terminal 1 accesses the service site, the service site 20 does not recognize which user it is. Thus, in procedure 3 described above, the Registration Manager 100 utilizes a private key registered in the internal Authenticator 10 of the registered terminal 1 to perform FIDO authentication for and log in to the target service site 20 and establishes a session. Next, in procedure 4 described above, the new terminal 2 is used as an external Authenticator 10 by the CTAP to perform Registration of a private key, to register the new terminal 2.

Control Sequence

Figure 3:
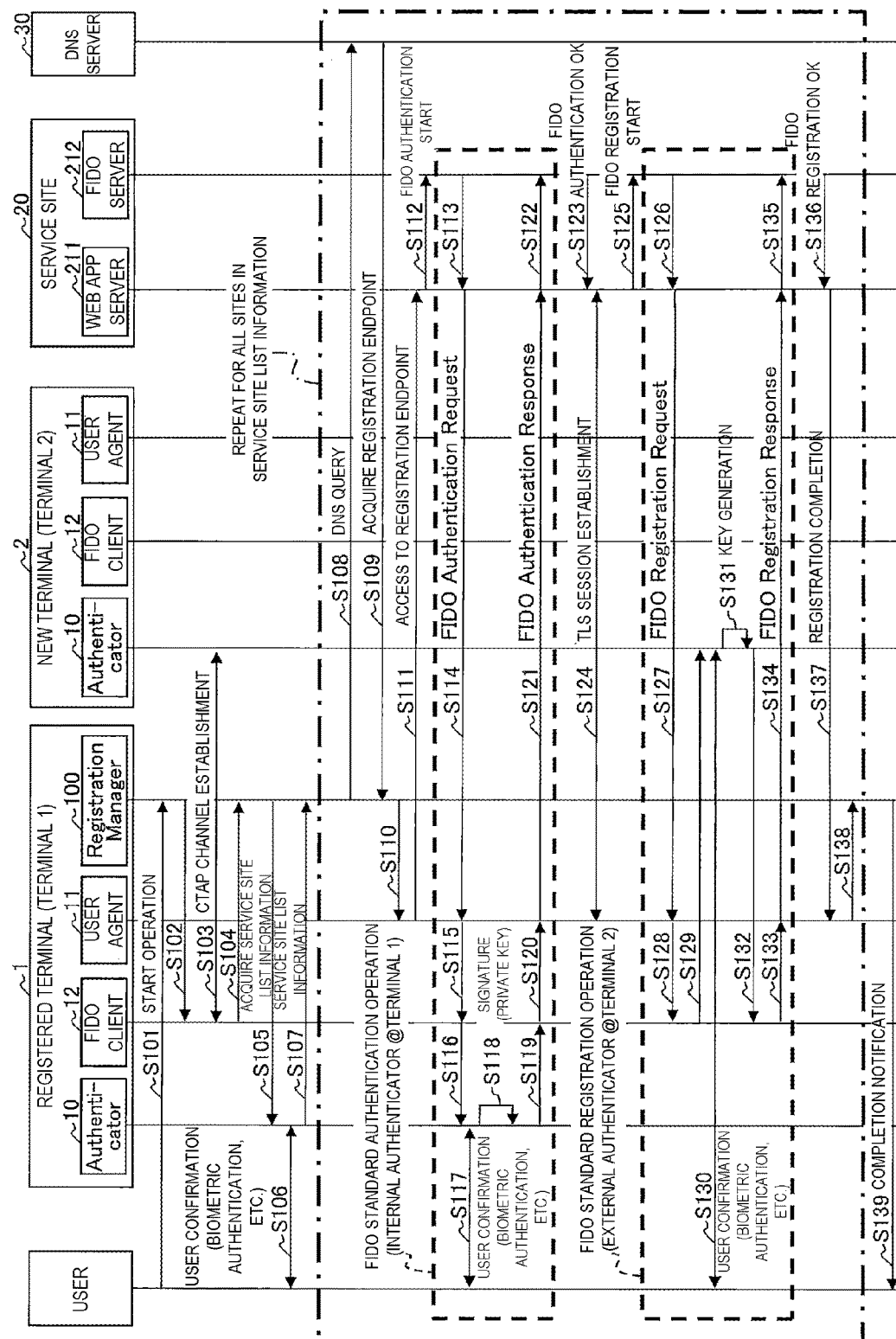
FIG. 3 is a sequence diagram illustrating a terminal registration method of the terminal registration system according to the first embodiment.

FIG. 3 is a sequence diagram illustrating the terminal registration method of the terminal registration system according to the present embodiment.

In FIG. 3, the terminal 1 is a registered terminal, and stores service site list information 110 in the Authenticator 10. The Registration Manager 100 is located in the terminal 1. The terminal 2 is a new terminal.

The Domain Name System server (DNS) 30 has and uses an extension (SeRVice record (SRV record)) to return a URL of a service provided on a corresponding URL in addition to the most primitive function of converting domain names to IP address formats. The DNS server 30 provides, in the form of SRV record, a location of a service for performing reregistration, or the like, provided on the site URL.

The user performs adding or changing to the new terminal 2 (for example, having two of a smartphone and a tablet terminal, or changing the terminal). In this case, in order to utilize FIDO authentication by the new terminal 2, Registration of a terminal needs to be performed on the service site in advance, and a public key of the terminal needs to be associated with the account. In other words, in FIDO, Registration of a private key needs to be performed for each Web service.

A user start operation is transmitted to the Registration Manager 100 of the registered terminal 1 (hereinafter referred to as the Registration Manager 100) (step S101), and the Registration Manager 100 transmits a request for performing FIDO authentication at the new terminal 2 to a FIDO client 12 of the registered terminal 1 (step S102). The FIDO client 12 of the registered terminal 1 establishes a CTAP channel with an Authenticator 10 of the new terminal 2 (step S103). The FIDO client 12 of the registered terminal 1 notifies the Registration Manager 100 of this CTAP channel establishment in a case where the CTAP channel is established (step S104).

The Registration Manager 100 transmits an acquisition request for the service site list information 110 (see FIG. 2) to the Authenticator 10 of the registered terminal 1 (step S105).

The Authenticator 10 of the registered terminal 1 performs user confirmation to prevent unintended fraudulent acquisition of the list (step S106). The user confirmation is user authentication using biometric information (fingerprint, face, iris, vein), information using Personal Identification Number (PIN) code authentication, or the like.

In a case where the Authenticator 10 of the registered terminal 1 has confirmed user confirmation by biometric authentication or the like, the Authenticator 10 transmits the service site list information 110 stored in the Authenticator 10 to the Registration Manager 100 (step S107).

The above is "acquisition of the service site list information" of procedure 1 of FIG. 2. The subsequent sequence corresponds to a process repeated for all the sites in the service site list information (corresponding to procedures 2 to 4 in FIG. 2, see a frame with a dot-dash line in FIG. 3).

The Registration Manager 100 transmits a DNS query to the DNS server 30 with reference to the acquired service site list information 110 (see FIG. 2), and inquires for a URL (hereinafter referred to as a registration endpoint) for access to a reregistration service provided on the site (step S108). The DNS server 30 transmits the registration endpoint to the Registration Manager 100, and the Registration Manager 100 acquires the registration endpoint (step S109).

The Registration Manager 100 transmits the acquired registration endpoint to a user agent 11 of the registered terminal 1 (step S110).

The user agent 11 of the registered terminal 1 accesses the registration endpoint on a Web application server 211 of a service site 20 (step S111). The Web application server 211 of the service site 20 outputs a FIDO authentication request to a FIDO server 212 to start FIDO authentication (step S112).

In the following sequence, a FIDO standard Authentication operation is performed via the Web application server 211 of the service site 20, the user agent 11 and the FIDO client 12 of the registered terminal 1, between the FIDO server 212 of the service site 20 and the Authenticator 10 of the registered terminal 1.

The FIDO standard Authentication operation, illustrated in a frame with a dashed line in FIG. 3, is to perform FIDO authentication for a registration target service site using a private key stored in the internal Authenticator 10 of the registered terminal 1.

The FIDO server 212 of the service site 20 issues a FIDO Authentication Request to the Web application server 211 (step S113), and the Web application server 211 transmits this FIDO Authentication Request to the user agent 11 of the registered terminal 1 (step S114). The user agent 11 of the registered terminal 1 transmits the FIDO Authentication Request to the FIDO client 12 (step S115), and the FIDO client 12 transmits this FIDO Authentication Request to the Authenticator 10 of the registered terminal 1 (step S116).

The Authenticator 10 of the registered terminal 1 performs user confirmation by biometric authentication with biometric information (fingerprint, face, iris, vein) (step S117). Note that FIDO authentication needs to be repeated for all service sites. In order to reduce user burden, the biometric authentication in step S117 is preferably as simple as possible, and examples include biometric authentication with a fingerprint. It is admitted that re-authentication within a predetermined period of time is omitted in extended functionality of the standard technology (FIDO). FIDO separates identity confirmation with biometric authentication and server authentication at the terminal, and does not transmit a password to the service site 20, and thus there is no risk of leak of personal information.

Here, in the FIDO standard Authentication operation, a random number (challenge string) is generated by the FIDO server 212 (first stage in step S113), and the random number is signed with a private key of the Authenticator 10 to return.

In a case where user confirmation is made, the Authenticator 10 of the registered terminal 1 signs the random number generated by the FIDO server 212 with the private key of the Authenticator 10 (step S118).

The Authenticator 10 transmits a FIDO Authentication Response signed with the private key to the FIDO client 12 (step S119), the FIDO client 12 transmits this FIDO Authentication Response to the user agent 11 of the registered terminal 1 (step S120), and the user agent 11 transmits the FIDO Authentication Response to the Web application server 211 of the service site 20 (step S121). The Web application server 211 of the service site 20 transmits the FIDO Authentication Response to the FIDO server 212 of the service site 20 (step S122).

The above-described step S113 to step S122 correspond to the FIDO standard Authentication operation for logging in by utilizing the internal Authenticator 10 of the registered terminal 1 (which holds the registered key).

The FIDO server 212 of the service site 20 transmits FIDO authentication OK to the Web application server 211 of the service site 20 (step S123), to establish a TLS Session between the Web application server 211 of the service site 20 and the user agent 11 of the registered terminal 1 (step S124). Once the TLS Session is established, the Web application server 211 notifies the FIDO server 212 of FIDO registration start (step S125).

A FIDO standard Registration operation, indicated by the frame with the dashed line in FIG. 3, is to perform Registration using the new terminal 2 as an external Authenticator 10 by the CTAP.

The FIDO server 212 of the service site 20 issues a FIDO Registration Request to the Web application server 211 (step S126), and the Web application server 211 transmits this FIDO Registration Request to the user agent 11 of the registered terminal 1 (step S127). The user agent 11 of the registered terminal 1 transmits the FIDO Registration Request to the FIDO client 12 of the registered terminal 1 (step S128), and the FIDO client 12 transmits this FIDO Registration Request to the Authenticator 10 of the new terminal 2 (step S129).

The Authenticator 10 of the new terminal 2 performs user confirmation by biometric authentication with biometric information (fingerprint, face, iris, vein), or the like (step S130). Note that in order to reduce user burden, for the biometric authentication, biometric authentication by a fingerprint, for example, is performed. Authentication within a predetermined time may be omitted.

In a case where user confirmation is made, the Authenticator 10 of the new terminal 2 newly generates a FIDO authentication (unregistered) private key using the CTAP (step S131). The Authenticator 10 of the new terminal 2 transmits the generated private key to the FIDO client 12 of the registered terminal 1 (step S132).

The FIDO client 12 of the registered terminal 1 transmits the generated private key to the user agent 11 of the registered terminal 1 (step S133). The user agent 11 of the registered terminal 1 transmits this FIDO Authentication (unregistered) private key as a FIDO Registration Response to the Web application server 211 of the service site 20 (step S134). The Web application server 211 of the service site 20 transmits this FIDO Registration Response to the FIDO server 212 (step S135).

In step S126 to step S135 described above, the new terminal (the terminal 2) is used as an external Authenticator by the CTAP to perform Registration of the newly generated private key. These steps correspond to the FIDO standard Registration operation.

The FIDO server 212 of the service site 20 transmits FIDO authentication OK to the Web application server 211 of the service site 20 in response to reception of the FIDO Registration Response (step S136). The Web application server 211 transmits registration completion of the FIDO Registration Request to the user agent 11 of the registered terminal 1 (step S137). The user agent 11 notifies the Registration Manager 100 of completion of the registration of the FIDO Registration Request (step S138).

The Registration Manager 100 confirms that FIDO authentication for the registration target service site using the private key of the registered terminal 1, and Registration of the newly generated keys at the new terminal 2 is completed, for all service sites. In a case where the Registration of keys of the new terminal 2 for all service sites is completed, the Registration Manager 100 issues a completion notification to the user to terminate the sequence (step S139).

As described above, because the Registration Manager 100 repeats the process for all sites in the service site list information, there may be a case where registration of a certain service site is not completed due to a communication failure or the like. Displaying a registration progress status for the user improves convenience for the user. The retry control and the display control of a registration progress status is described later in FIG. 8.

As described above, the terminal registration system according to the present embodiment is a system for registering a new terminal 2 to a plurality of service sites 20 using a registered terminal 1, and the registered terminal 1 includes an Authenticator 10 including service site list information 110 that associates private keys with URLs for access to service sites. The Registration Manager 100 acquires the service site list information 110 from the Authenticator 10 of the registered terminal 1. Then, the Registration Manager 100 performs FIDO authentication for a registration target service site using a private key of the registered terminal 1, on the basis of the acquired service site list information 110, and performs Registration of a newly generated cryptographic key at the new terminal 2. In the present embodiment, the Registration Manager 100 is located on the registered terminal 1 side. The Registration Manager 100 logs in to registration target service sites for all the private keys registered in the Authenticator 10 of the registered terminal 1, and performs Registration using the new terminal 2 as an external Authenticator 10 by the CTAP.

This can support a use case in which the registered terminal 1 is used to perform Registration of the new terminal 2 at service sites that only have FIDO authentication means. Because the Registration Manager 100 performs access and Registration automatically for registration target service sites, based on the service site list information 110 acquired from the Authenticator 10 of the registered terminal 1, user convenience in terms of Registration on a plurality of service sites can be improved.

As the Registration Manager 100 acquires the service site list stored in the registered terminal 1 and starts Registration for all of the services, the burden, on the user, of managing service sites that are being utilized (Registration is demanded to be performed at the beginning of using the new terminal) by the user is eliminated.

By automatically performing access to each site that triggers Registration, work burden on the user when the number of service sites increases is reduced.

In the present embodiment, the Registration Manager 100 is located on the registered terminal 1 side, so the registration result is displayed on the registered terminal 1 originally used. The registered terminal 1 is a terminal familiar to the user. The user can confirm the registration result on the familiar registered terminal 1 side.

Second Embodiment

The second embodiment is an example of locating the Registration Manager 100 on the new terminal 2 side.

Figure 4:
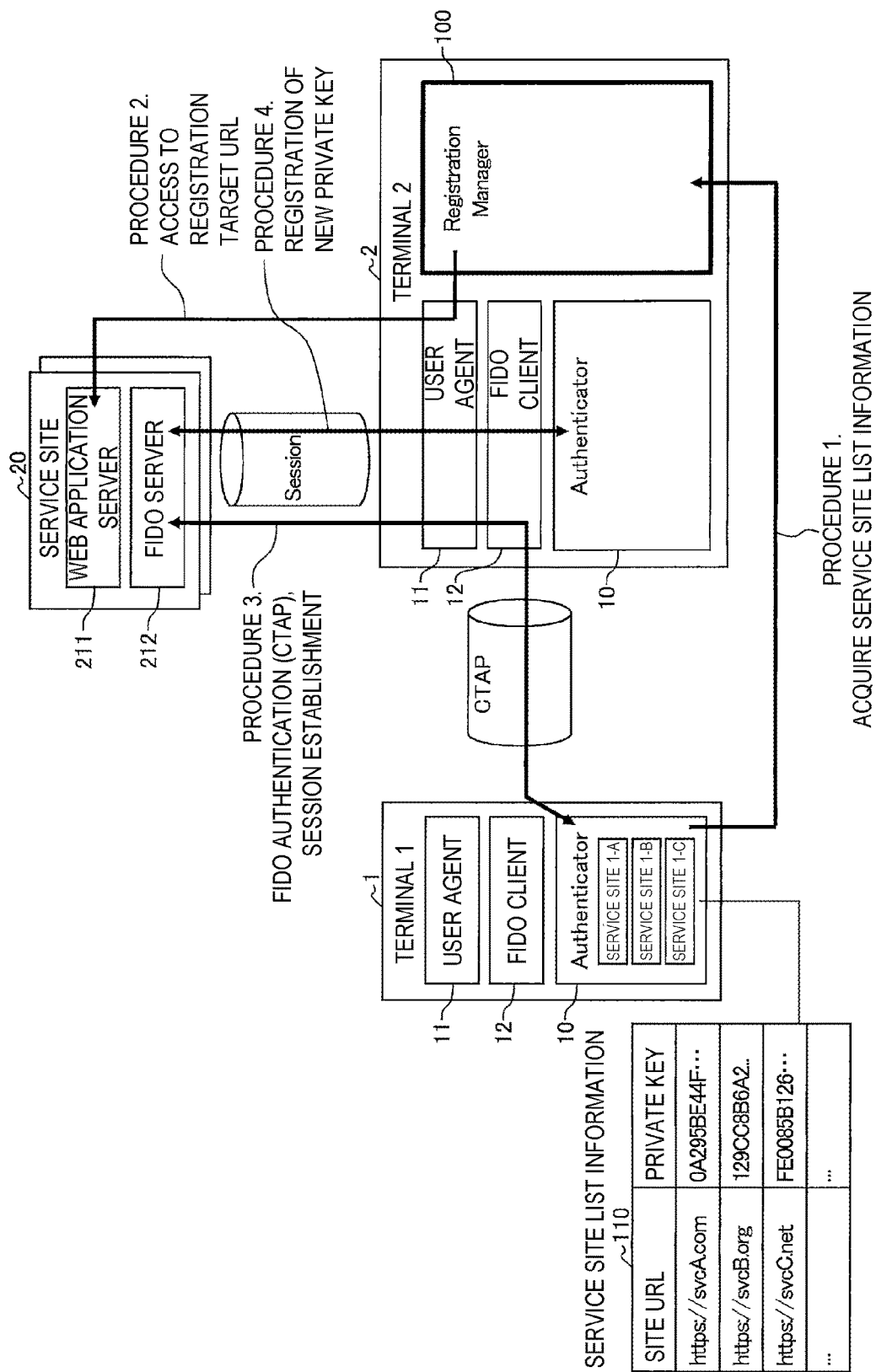
FIG. 4 is a configuration diagram illustrating a terminal registration system according to a second embodiment of the present invention.

FIG. 4 is a configuration diagram illustrating a terminal registration system according to the second embodiment of the present invention. Components identical to those in FIG. 2 are labeled with the same reference signs, and descriptions of overlapping parts will be omitted. Note that CTAP, which is illustrated by a cylindrical shape in FIG. 4, indicates CTAP use, and Session, which is illustrated by a cylindrical shape, indicates that a Session is established in the communication path.

A terminal 1 is a registered terminal 1, and a terminal 2 is a new terminal 2. The registered terminal 1 stores, in the Authenticator 10, a private key 1-A paired with a public key 1-A, a private key 1-B paired with a public key 1-B, a private key 1-C paired with a public key 1-C, and service site list information 110.

In the present embodiment, a Registration Manager 100 is located on the new terminal 2 side.

The Registration Manager 100 acquires the service site list information 110 of all sites from an Authenticator 10 of the registered terminal 1, and uses the registered terminal 1 as an external Authenticator 10 by the CTAP to perform FIDO authentication and log in to each site. The new terminal 2 performs Registration processing related to Authenticator of the terminal in an established session.

A terminal registration method of the terminal registration system configured as described above will be described below.

Operation Overview

First, an operation overview of the terminal registration method of the terminal registration system is described.

As illustrated in FIG. 4, the Registration Manager 100 is located on the new terminal 2 side.

Procedure 1: The Registration Manager 100 acquires the service site list information 110 of the registered terminal 1 from the Authenticator 10 of the registered terminal 1. The Registration Manager 100 performs processing of following procedure 2 to procedure 4 for all URLs of the acquired service site list information 110.

Procedure 2: The Registration Manager 100 accesses the service site 20 of the registration target URL, based on the acquired service site list information 110.

Procedure 3: The Registration Manager 100 uses the registered terminal 1 as an external Authenticator 10 by the CTAP to perform FIDO authentication and log in, and establishes a session.

Procedure 4: The new terminal 2 performs Registration processing related to Authenticator of the terminal in the established session.

Control Sequence

Figure 5:
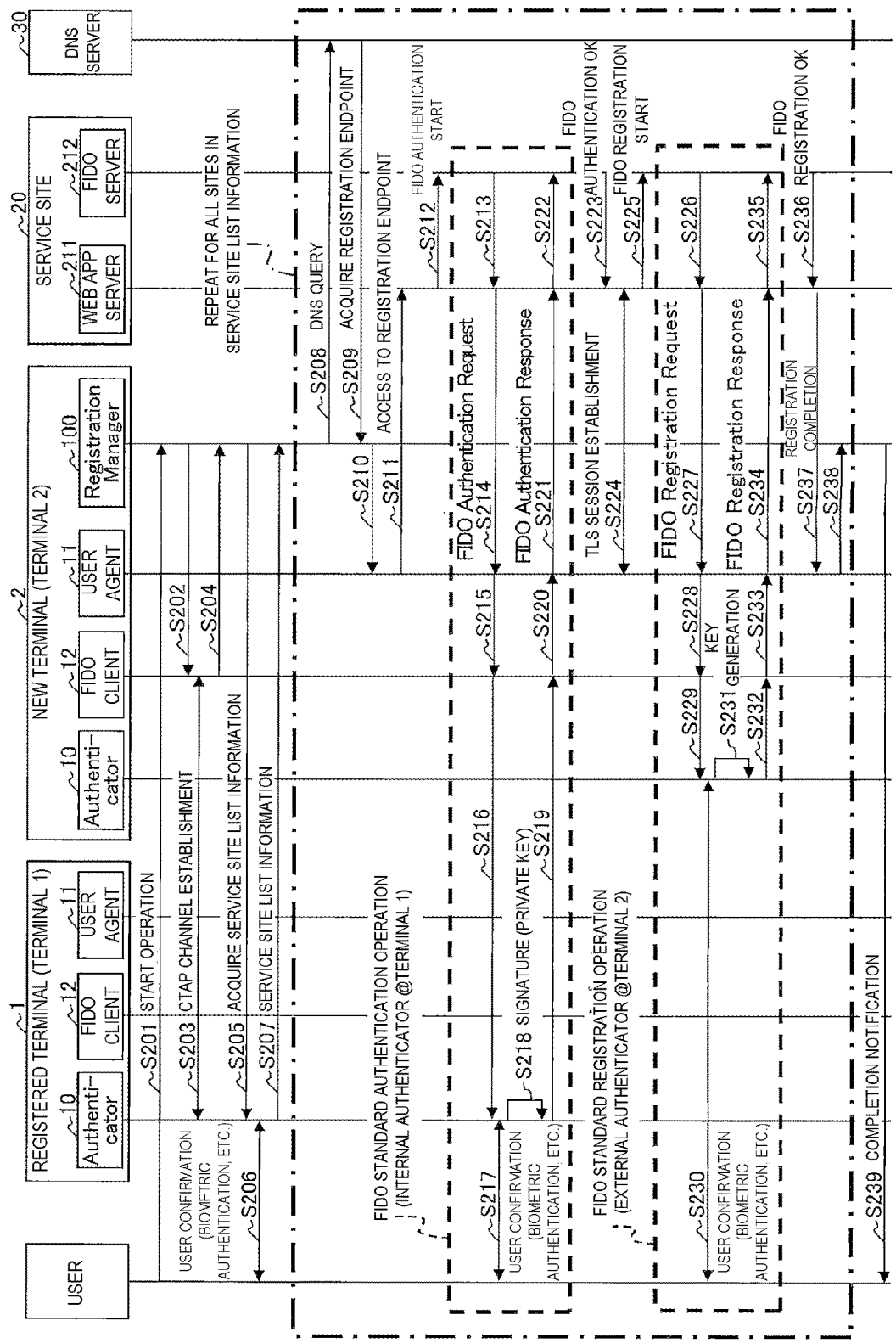
FIG. 5 is a sequence diagram illustrating a terminal registration method of the terminal registration system according to the second embodiment.

FIG. 5 is a sequence diagram illustrating the terminal registration method of the terminal registration system according to the present embodiment.

In FIG. 5, the terminal 1 is a registered terminal, and stores service site list information 110 in the Authenticator 10. A terminal 2 is a new terminal, where a Registration Manager 100 is located.

Start operation of the user is transmitted to the Registration Manager 100 of the new terminal 2 (hereinafter referred to as the Registration Manager 100) (step S201), and the Registration Manager 100 transmits a request for performing FIDO authentication at the new terminal 2 to a FIDO client 12 of the new terminal 2 (step S202). The FIDO client 12 of the new terminal 2 establishes a CTAP channel with the Authenticator 10 of the registered terminal 1 (step S203). In a case where the CTAP channel is established with the Authenticator 10 of the registered terminal 1, the FIDO client 12 of the new terminal 2 notifies the Registration Manager 100 of the establishment of the CTAP channel (step S204).

The Registration Manager 100 transmits an acquisition request for the service site list information 110 (see FIG. 4) to the Authenticator 10 of the registered terminal 1 (step S205).

The Authenticator 10 of the registered terminal 1 performs user confirmation to prevent unintended fraudulent acquisition of the list (step S206). The user confirmation is user authentication using biometric information (fingerprint, iris, vein), information using PIN, or the like.

In a case where the Authenticator 10 of the registered terminal 1 confirms user confirmation by biometric authentication or the like, the Authenticator 10 transmits the service site list information 110 stored in the Authenticator 10 to the Registration Manager 100 (step S207).

The above is "acquisition of the service site list information" of procedure 1 of FIG. 4. The subsequent sequence corresponds to a repeat for all the sites in the service site list information (corresponding to procedures 2 to 4 in FIG. 4, see a frame with a dot-dash line in FIG. 5).

The Registration Manager 100 transmits a DNS query to a DNS server 30 to inquire for a registration endpoint (step S208) with reference to the acquired service site list information 110 (see FIG. 4). The DNS server 30 transmits the registration endpoint to the Registration Manager 100, and the Registration Manager 100 acquires the registration endpoint (step S209).

The Registration Manager 100 transmits the acquired registration endpoint to a user agent 11 of the new terminal 2 (step S210).

The user agent 11 of the new terminal 2 accesses the registration endpoint on a Web application server 211 of the service site 20 (step S211). The Web application server 211 of the service site 20 outputs a FIDO authentication request to a FIDO server 212 to start FIDO authentication (step S212).

In the following sequence, a FIDO standard Authentication operation is performed via the Web application server 211 of the service site 20, the user agent 11 and the FIDO client 12 of the new terminal 2, between the FIDO server 212 of the service site 20 and the Authenticator 10 of the registered terminal 1.

The FIDO standard Authentication operation, illustrated in a frame with a dashed line in FIG. 5, first acquires a URL list of all sites from the external Authenticator 10 of the registered terminal 1. Next, for each site, the registered terminal 1 is used as the external Authenticator by the CTAP, to perform FIDO authentication and log in.

The FIDO server 212 of the service site 20 issues a FIDO Authentication Request to the Web application server 211 (step S213), and the Web application server 211 transmits this FIDO Authentication Request to the user agent 11 of the new terminal 2 (step S214). The user agent 11 of the new terminal 2 transmits the FIDO Authentication Request to the FIDO client 12 of the new terminal 2 (step S215), and the FIDO client 12 transmits this FIDO Authentication Request to the Authenticator 10 of the registered terminal 1 (step S216).

The Authenticator 10 of the registered terminal 1 performs user confirmation by biometric authentication with biometric information (fingerprint, face, iris, vein) or the like (step S217). Note that in order to reduce user burden, for the biometric authentication, biometric authentication by a fingerprint, for example, is performed. Authentication within a predetermined time may be omitted.

In a case where user confirmation is made, the Authenticator 10 of the registered terminal 1 signs the random number generated by the FIDO server 212 with a private key of the Authenticator 10 (step S218).

The Authenticator 10 transmits a FIDO Authentication Response signed with the private key to the FIDO client 12 (step S119), the FIDO client 12 transmits this FIDO Authentication Response to the user agent 11 of the new terminal 2 (step S220), and the user agent 11 of the new terminal 2 transmits the FIDO Authentication Response to the Web application server 211 of the service site 20 (step S221). The Web application server 211 of the service site 20 transmits the FIDO Authentication Response to the FIDO server 212 of the service site 20 (step S222).

In step S213 to step S222 described above, the registered terminal 1 is used as the external Authenticator by the CTAP, to perform FIDO authentication and log in. These steps correspond to the FIDO standard Authentication operation.

The FIDO server 212 of the service site 20 transmits FIDO authentication OK to the Web application server 211 of the service site 20 (step S223), to establish a TLS Session between the Web application server 211 of the service site 20 and the user agent 11 of the new terminal 2 (step S224). Once the TLS Session has been established, the Web application server 211 notifies the FIDO server 212 of FIDO registration start (step S225).

The FIDO standard Registration operation, indicated with the frame with the dashed line in FIG. 5, is for the new terminal 2 to perform Registration processing related to Authenticator of the terminal in the established session.

The FIDO server 212 of the service site 20 issues a FIDO Registration Request to the Web application server 211 (step S126), and the Web application server 211 transmits this FIDO Registration Request to the user agent 11 of the new terminal 2 (step S227). The user agent 11 of the new terminal 2 transmits the FIDO Registration Request to the FIDO client 12 (step S228), and the FIDO client 12 transmits this FIDO Registration Request to the Authenticator 10 of the new terminal 2 (step S229).

The Authenticator 10 of the new terminal 2 performs user confirmation by biometric authentication with biometric information (fingerprint, face, iris, vein), or the like (step S230). Note that in order to reduce user burden, for the biometric authentication, biometric authentication by a fingerprint, for example, is performed. Authentication within a predetermined time may be omitted.

In a case where user confirmation has been made, the Authenticator 10 of the new terminal 2 newly generates a FIDO authentication (unregistered) private key using the CTAP (step S231). The Authenticator 10 of the new terminal 2 transmits the generated private key to the FIDO client 12 of the new terminal 2 (step S232). The FIDO client 12 of the new terminal 2 transmits the generated private key to the user agent 11 of the new terminal 2 (step S233). The user agent 11 of the new terminal 2 transmits this FIDO Authentication (unregistered) private key as a FIDO Registration Response to the Web application server 211 of the service site 20 (step S234). The Web application server 211 of the service site 20 transmits this FIDO Registration Response to the FIDO server 212 (step S235).

In the above-described step S226 to step S235, the new terminal 2 performs Registration processing related to Authenticator of the terminal in the established session. These steps correspond to the FIDO standard Registration operation.

The FIDO server 212 of the service site 20 transmits FIDO authentication OK to the Web application server 211 of the service site 20 in response to reception of the FIDO Registration Response (step S236). The Web application server 211 transmits registration completion of the FIDO Registration Request to the user agent 11 of the new terminal 2 (step S237). The user agent 11 notifies the Registration Manager 100 of the registration completion of the FIDO Registration Request (step S238).

The Registration Manager 100 confirms that Registration of the newly generated keys at the new terminal 2 is completed for all service sites. In a case where the Registration of keys of the new terminal 2 for all service sites is completed, the Registration Manager 100 issues a completion notification to the user to terminate the sequence (step S239).

As described above, because the Registration Manager 100 repeats for all sites in the service site list information, there may be a case where registration of a certain service site is not completed due to a communication failure or the like. The retry control and the display control of a registration progress status is described later in FIG. 8.

As described above, in the terminal registration system according to the present embodiment, the Registration Manager 100 is located on the new terminal 2 side. The Registration Manager 100 acquires a URL list of all service sites from the Authenticator 10 of the registered terminal 1, and uses the registered terminal 1 as the external Authenticator 10 by the CTAP to perform FIDO authentication and log in to all service sites, and the new terminal 2 performs Registration related to Authenticator 10 of the terminal in the established session.

In the present embodiment, as described above, the Registration Manager 100 automatically makes accesses, in accordance with the URL list acquired from the Authenticator 10 of the registered terminal 1 to perform Registration. This can bring the same benefits as the first embodiment, i.e., improve user convenience in terms of Registration on a plurality of service sites.

The burden, on the user, of managing service sites that are being utilized (Registration is demanded to be performed at the beginning of using the new terminal) by the user is eliminated. Furthermore, work burden on the user is reduced when the number of service sites increases.

In the present embodiment, the Registration Manager 100 is located on the new terminal 2 side, so the registration result is displayed on the new terminal 2. The registration result can be confirmed on the side of the new terminal 2 the user is beginning to use. In general, the new terminal 2 is often more functional than a terminal that has been used until now, so Registration and registration result display can be performed using resources of the new terminal 2 with higher functionality (for example, high resolution, larger screen, high-speed drawing, high-speed communication, or the like).

Third Embodiment

A third embodiment is an example in which the Registration Manager 100 is located on an external device 3 side different from the registered terminal 1 and the new terminal 2.

Figure 6:
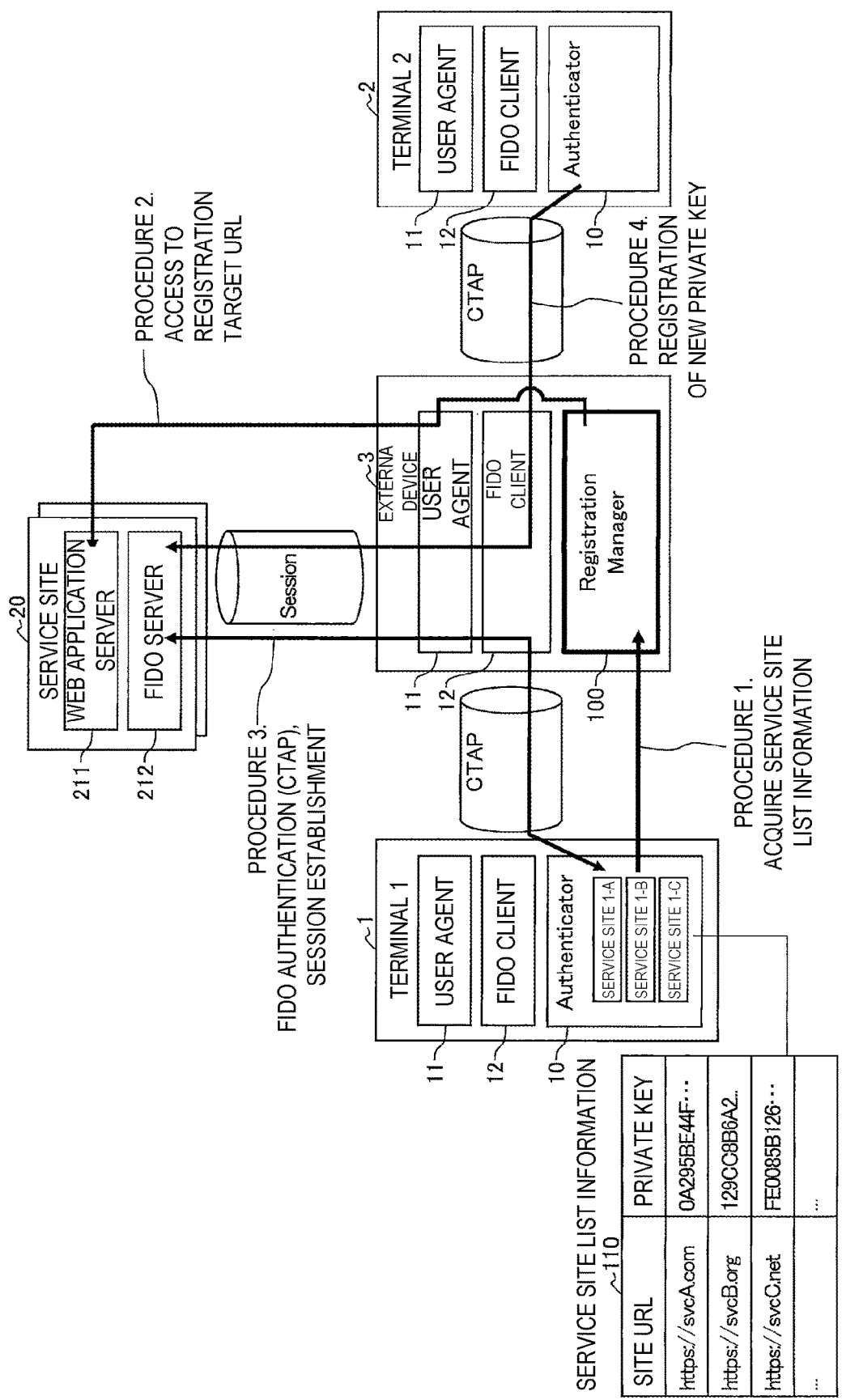
FIG. 6 is a configuration diagram illustrating a terminal registration system according to a third embodiment of the present invention.

FIG. 6 is a configuration diagram illustrating a terminal registration system according to the third embodiment of the present invention. Components identical to those in FIG. 2 and FIG. 4 are labeled with the same reference signs, and descriptions of overlapping parts will be omitted. Note that CTAP, which is illustrated by a cylindrical shape in FIG. 5, indicates CTAP use, and Session, which is illustrated by a cylindrical shape, indicates that a Session is established in the communication path.

A terminal 1 is a registered terminal, and a terminal 2 is a new terminal. The registered terminal 1 stores, in the Authenticator 10, a private key 1-A paired with a public key 1-A, a private key 1-B paired with a public key 1-B, a private key 1-C paired with a public key 1-C, and service site list information 110.

The external device 3 is, for example, a personal computer (PC). The external device 3 may be a Universal Serial Bus (USB) token that is inserted into a USB port of PC. A USB token is a key for using PC, and in a case where no USB token is not present or not enabled, particular data cannot be opened or a network cannot be connected. The USB token may also be provided with biometric authentication means such as fingerprint authentication.

The external device 3 includes a user agent 11 and a FIDO client 12 in a normal region, and an Authenticator 10 in a secure region.

The Authenticator 10 of the external device 3 corresponds to an external Authenticator when viewed from the terminals 1 and 2 performing the FIDO standard Authentication operation.

In the present embodiment, the Registration Manager 100 is located on the external device 3 side different from the registered terminal 1 and the new terminal 2. The Registration Manager 100 acquires a URL list of all service sites from the registered terminal 1, and performs FIDO authentication using the registered terminal 1 as an external Authenticator to log in to each site. After that, the new terminal 2 is used as an external Authenticator to newly perform Registration.

A terminal registration method of the terminal registration system configured as described above will be described below.

Operation Overview

First, an operation overview of the terminal registration method of the terminal registration system is described.

As illustrated in FIG. 6, the Registration Manager 100 is located on the external device 3 side.

Procedure 1: The Registration Manager 100 acquires the service site list information 110 of the registered terminal 1 from the Authenticator 10 of the registered terminal 1. The Registration Manager 100 performs processing of following procedure 2 to procedure 4 for all URLs of the acquired service site list information 110.

Procedure 2: The Registration Manager 100 accesses the service site 20 of the registration target URL, based on the acquired service site list information 110.

Procedure 3: The Registration Manager 100 uses the registered terminal 1 as an external Authenticator 10 by the CTAP to perform FIDO authentication and log in, and establishes a session.

Procedure 4: After logging in, the new terminal 2 is used as an external Authenticator to newly perform Registration processing.

Control Sequence

Figure 7:
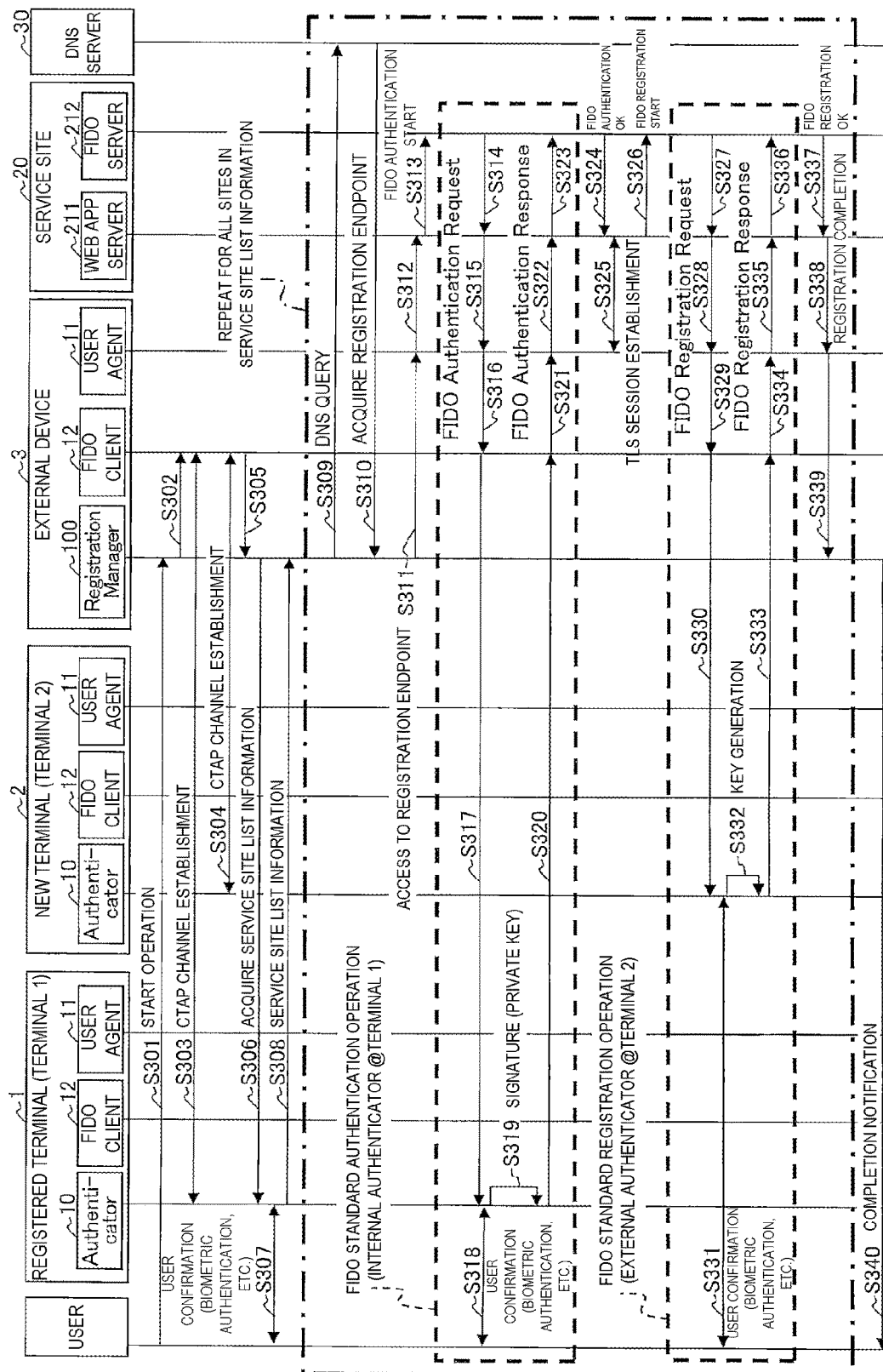
FIG. 7 is a sequence diagram illustrating a terminal registration method of the terminal registration system according to the third embodiment.

FIG. 7 is a sequence diagram illustrating the terminal registration method of the terminal registration system according to the present embodiment.

In FIG. 7, the user start operation is transmitted to the Registration Manager 100 of the external device 3 (hereinafter referred to as the Registration Manager 100) (step S301), and the Registration Manager 100 transmits a request for performing FIDO authentication at the new terminal 2 for a FIDO client 12 of the external device 3 (step S302). The FIDO client 12 of the external device 3 establishes a CTAP channel with the Authenticator 10 of the registered terminal 1 (step S303). The FIDO client 12 of the external device 3 establishes a CTAP channel with an Authenticator 10 of the new terminal 2 (step S304). In other words, the external device 3 establishes each CTAP channel with both of the Authenticator 10 of the registered terminal 1 and the Authenticator 10 of the new terminal 2.

In a case where each CTAP channel is established with the Authenticator 10 of the registered terminal 1 and the Authenticator 10 of the new terminal 2, the FIDO client 12 of the external device 3 notifies the Registration Manager 100 of this CTAP channel establishment (step S305).

The Registration Manager 100 transmits an acquisition request for the service site list information 110 (see FIG. 7) to the Authenticator 10 of the registered terminal 1 (step S306).

The Authenticator 10 of the registered terminal 1 performs user confirmation to prevent unintended fraudulent acquisition of the list (step S307). The user confirmation is user authentication using biometric information (fingerprint, face, iris, vein), information using PIN, or the like.

In a case where the Authenticator 10 of the registered terminal 1 has confirmed user confirmation by biometric authentication or the like, the Authenticator 10 transmits the service site list information 110 stored in the Authenticator 10 to the Registration Manager 100 (step S308).

The above is "acquisition of the service site list information" of procedure 1 of FIG. 6. The subsequent sequence corresponds to a process repeated for all the sites in the service site list information (corresponding to procedures 2 to 4 in FIG. 6, see a frame with a dot-dash line in FIG. 7).

The Registration Manager 100 transmits a DNS query to a DNS server 30 to inquire for a registration endpoint (step S309) with reference to the acquired service site list information 110 (see FIG. 6). The DNS server 30 transmits the registration endpoint to the Registration Manager 100, and the Registration Manager 100 acquires the registration endpoint (step S310).

The Registration Manager 100 transmits the acquired registration endpoint to a user agent 11 of the external device 3 (step S311). The user agent 11 of the external device 3 accesses the registration endpoint on a Web application server 211 of the service site 20 (step S312). The Web application server 211 of the service site 20 outputs a FIDO authentication request to a FIDO server 212 of the service site 20 to start FIDO authentication (step S313).

In the following sequence, a FIDO standard Authentication operation is performed via the Web application server 211 of the service site 20, the user agent 11 and the FIDO client 12 of the external device 3, between the FIDO server 212 of the service site 20 and the Authenticator 10 of the registered terminal 1.

The FIDO standard authentication operation, illustrated in a frame with a dashed line in FIG. 7, is to acquire the service site list information 110 of all service sites from the registered terminal 1, and perform FIDO authentication using the registered terminal 1 as an external Authenticator to log in to each site. After that, the new terminal 2 is used as an external Authenticator to newly perform Registration.

The FIDO server 212 of the service site 20 issues a FIDO Authentication Request to the Web application server 211 (step S314), and the Web application server 211 transmits this FIDO Authentication Request to the user agent 11 of the external device 3 (step S315). The user agent 11 of the external device 3 transmits the FIDO Authentication Request to the FIDO client 12 of the external device 3 (step S316), and the FIDO client 12 transmits this FIDO Authentication Request to the Authenticator 10 of the registered terminal 1 (step S317).

The Authenticator 10 of the registered terminal 1 performs user confirmation by biometric authentication with biometric information (fingerprint, iris, vein) or the like (step S318). Note that in order to reduce user burden, for example, biometric authentication by a fingerprint, as the biometric authentication, is performed. Authentication within a predetermined time may be omitted.

In a case where user confirmation is made, the Authenticator 10 of the registered terminal 1 signs the random number generated by the FIDO server 212 with a private key of the Authenticator 10 (step S118).

The Authenticator 10 transmits a FIDO Authentication Response signed with the private key to the FIDO client 12 (step S320), the FIDO client 12 transmits this FIDO Authentication Response to the user agent 11 of the external device 3 (step S321), and the user agent 11 of the external device 3 transmits the FIDO Authentication Response to the Web application server 211 of the service site 20 (step S322). The Web application server 211 of the service site 20 transmits the FIDO Authentication Response to the FIDO server 212 of the service site 20 (step S323).

In step S314 to step S323 described above, the registered terminal 1 is used as an external Authenticator, to perform FIDO authentication and log in. These steps correspond to the FIDO standard Authentication operation.

The FIDO server 212 of the service site 20 transmits FIDO authentication OK to the Web application server 211 of the service site 20 (step S324), to establish a TLS Session between the Web application server 211 of the service site 20 and the user agent 11 of the external device 3 (step S325). Once the TLS Session is established, the Web application server 211 notifies the FIDO server 212 of FIDO registration start (step S326).

The FIDO standard Registration operation, indicated in the frame with the dashed line in FIG. 7, is to use the registered terminal 1 as an external Authenticator to perform FIDO authentication and log in, and then use the new terminal 2 as an external Authenticator to newly perform Registration processing.

The FIDO server 212 of the service site 20 issues a FIDO Registration Request to the Web application server 211 (step S327), and the Web application server 211 transmits this FIDO Registration Request to the user agent 11 of the external device 3 (step S328). The user agent 11 of the external device 3 transmits the FIDO Registration Request to the FIDO client 12 (step S329), and the FIDO client 12 transmits this FIDO Registration Request to the Authenticator 10 of the new terminal 2 (step S330).

The Authenticator 10 of the new terminal 2 performs user confirmation by biometric authentication with biometric information (fingerprint, iris, vein), or the like (step S331). Note that in order to reduce user burden, for example, biometric authentication by a fingerprint, as the biometric authentication, is performed. Authentication within a predetermined time may be omitted.

In a case where user confirmation is made, the Authenticator 10 of the new terminal 2 newly generates a FIDO authentication (unregistered) private key using the CTAP (step S332). The Authenticator 10 of the new terminal 2 transmits the generated private key to the FIDO client 12 of the external device 3 (step S333).

The FIDO client 12 of the external device 3 transmits the generated private key to the user agent 11 of the external device 3 (step S334). The user agent 11 of the external device 3 transmits this FIDO Authentication (unregistered) private key as a FIDO Registration Response to the Web application server 211 of the service site 20 (step S335). The Web application server 211 of the service site 20 transmits this FIDO Registration Response to the FIDO server 212 of the service site (step S336).

In the above-described step S327 to step S336, the new terminal 2 is used as an external Authenticator to newly perform Registration processing. These steps correspond to the FIDO standard Registration operation.

The FIDO server 212 of the service site 20 transmits FIDO authentication OK to the Web application server 211 of the service site 20 in response to reception of the FIDO Registration Response (step S337). The Web application server 211 transmits registration completion of the FIDO Registration Request to the user agent 11 of the external device 3 (step S338). The user agent 11 notifies the Registration Manager 100 of the registration completion of the FIDO Registration Request (step S339).

The Registration Manager 100 confirms that Registration of the newly generated keys at the new terminal 2 is completed for all service sites. In a case where the Registration of keys of the new terminal 2 for all service sites is completed, the Registration Manager 100 issues a completion notification to the user to terminate the sequence (step S340).

As described above, because the Registration Manager 100 repeats the process for all sites in the service site list information, there may be a case where registration of a certain service site is not completed due to a communication failure or the like. The retry control and the display control of a registration progress status is described later in FIG. 8.

As described above, in the terminal registration system according to the present embodiment, the Registration Manager 100 is located on the side of the external device 3 different from the registered terminal 1 and the new terminal 2. The Registration Manager 100 acquires a URL list of all service sites from the registered terminal 1, and performs FIDO authentication using the registered terminal 1 as an external Authenticator 10 to log in to each service site. After that, the new terminal 2 is used as an external Authenticator 10 to newly perform Registration.

Thus, the present embodiment can bring the same benefits as the first embodiment and the second embodiment, i.e., improve user convenience in terms of Registration on a plurality of service sites. There is no burden of managing service sites that are being utilized (Registration is demanded to be performed at the beginning of using the new terminal) by the user itself. Furthermore, work burden on the user is reduced when the number of service sites increases.

In the present embodiment, the Registration Manager 100 is located on the external device 3 side, which makes it possible to minimize functional configuration required on terminal sides. Resources of terminals can be secured. In a case where there is a constraint on the functionality of the terminals, it is also possible to make selection on an external device 3 side having higher functionality.

Retry Control and Progress Status Notification

Examples of retry control and progress status notification will now be described. FIG. 8 is a sequence diagram illustrating a retry control and progress status notification.

The Registration Manager 100 may be located either on the registered terminal 1 side, on the new terminal 2 side, or external to the terminals 1 and 2. Registration target service sites 20 is assumed to be a service site A21, a service site B22, and a service site C23.

A user start operation is transmitted to a Registration Manager 100 (step S401), and the Registration Manager 100 acquires service site list information 110 from the registered terminal 1 (step S402). Then, the Registration Manager 100 notifies the user of registration start (step S403).

Note that a specific sequence leading to the acquisition of the service site list information 110 from the user start operation is described in detail with reference to FIGS. 3, 5, and 7.

Figure 8:
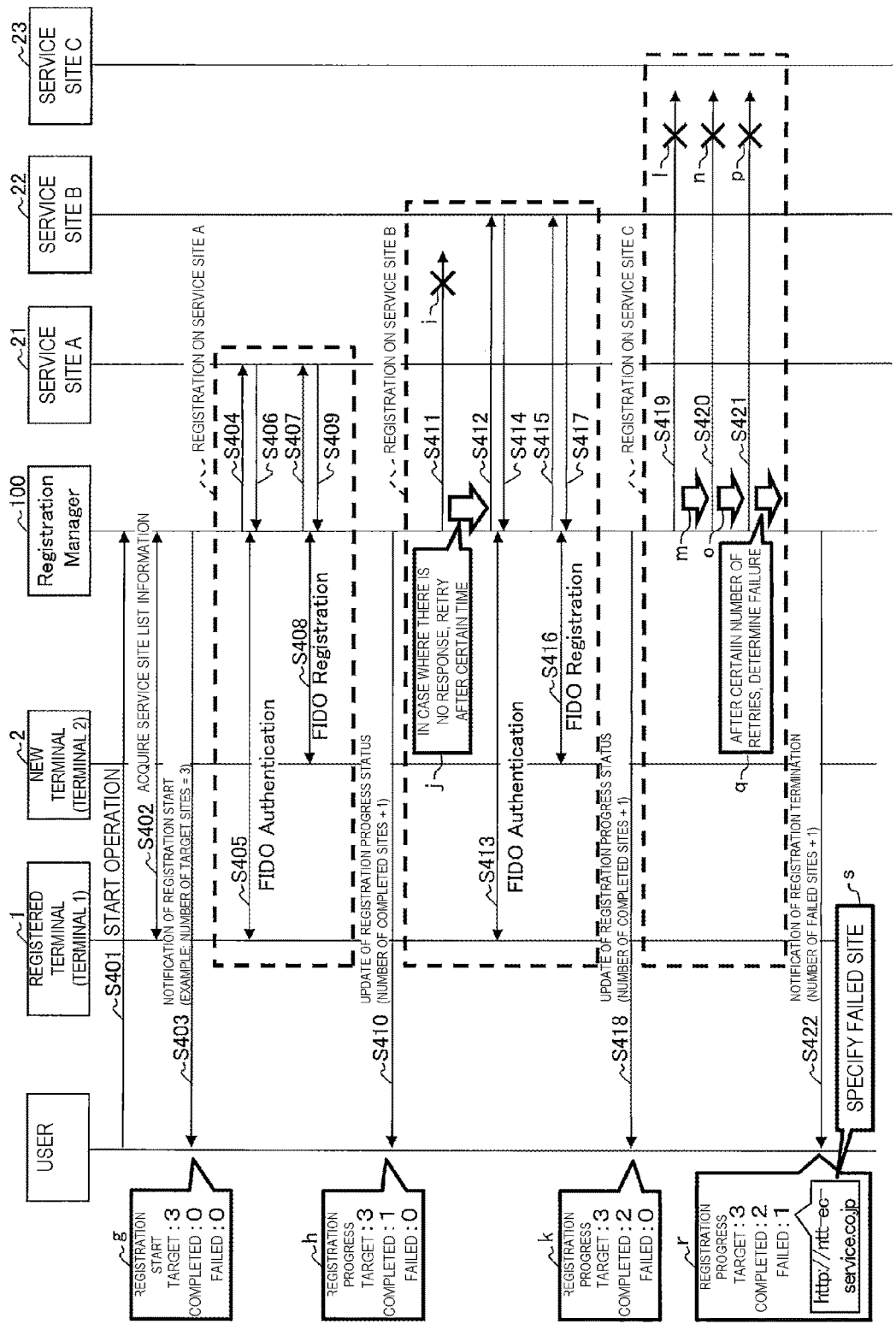
FIG. 8 is a sequence diagram illustrating a retry control and progress status notification.
Figure 9:
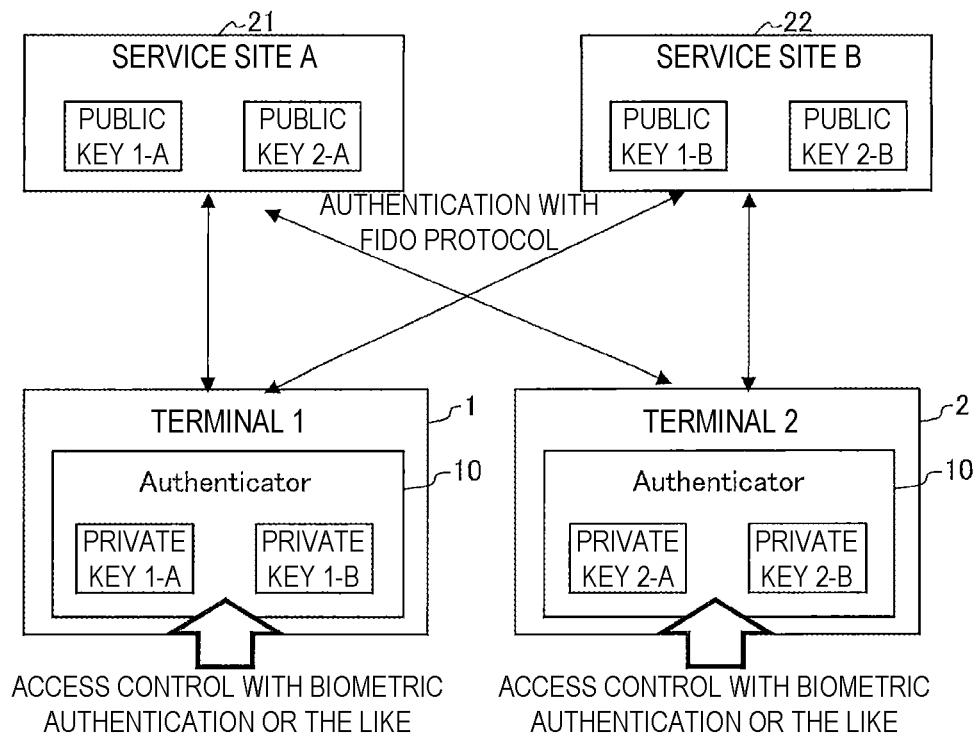
FIG. 9 is a diagram illustrating features of the standard technology (FIDO).
Figure 10:
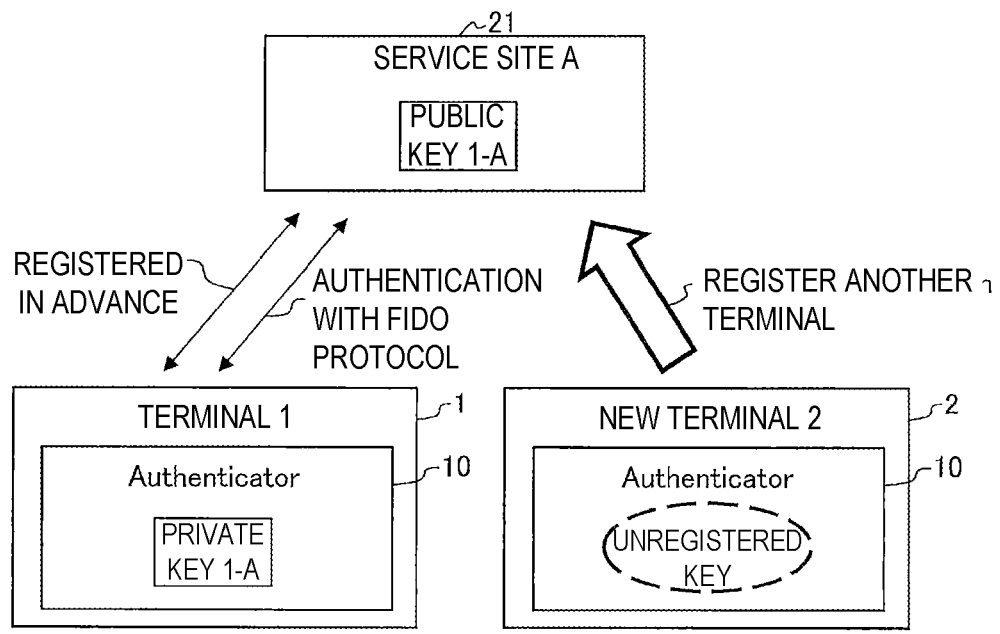
FIG. 10 is a diagram illustrating registration of a new terminal in the standard technology (FIDO).
Figure 11:
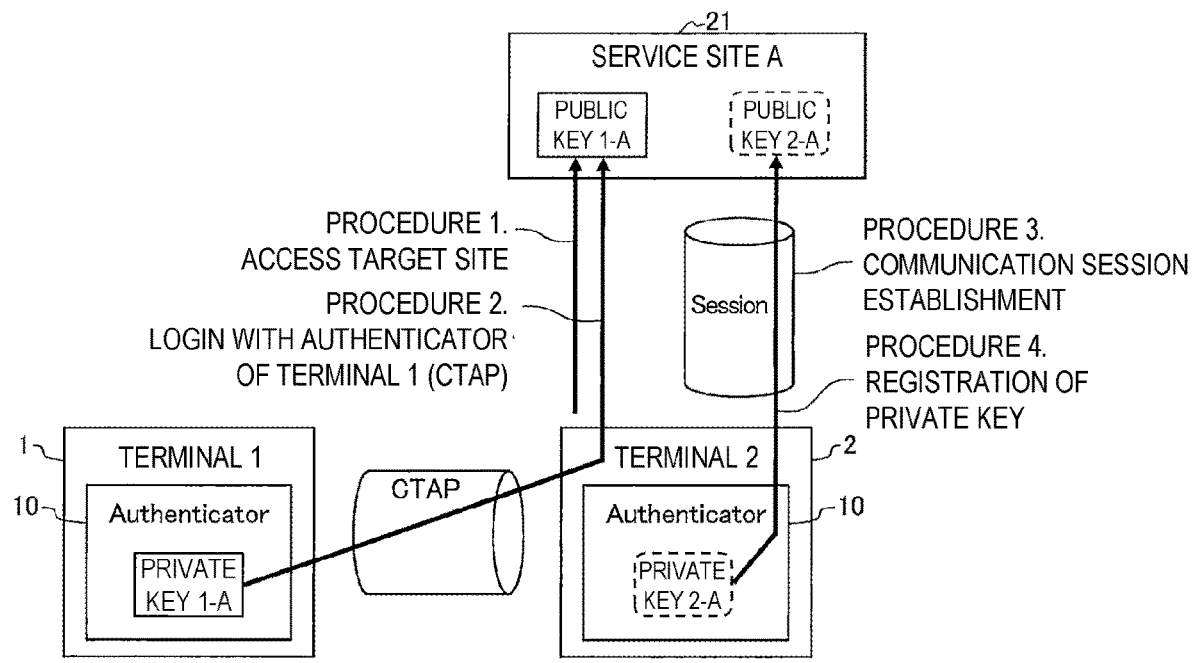
FIG. 11 is a diagram illustrating technique 1 for Registration of a new terminal key using the CTAP.
Figure 12:
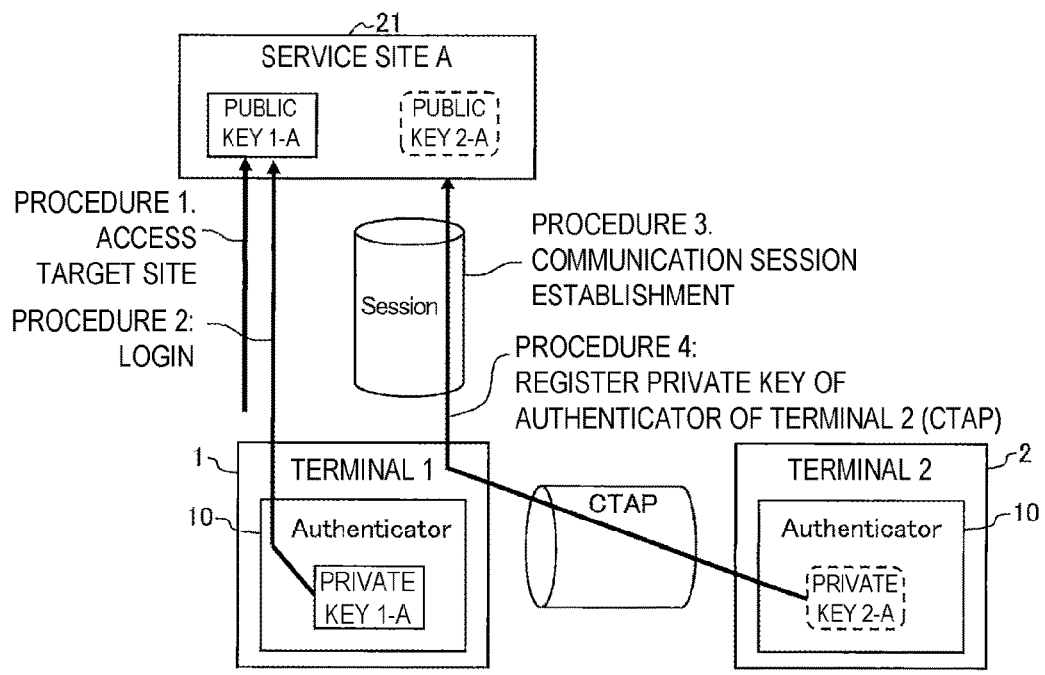
FIG. 12 is a diagram illustrating technique 2 for Registration of a new terminal key using the CTAP.
Figure 13:
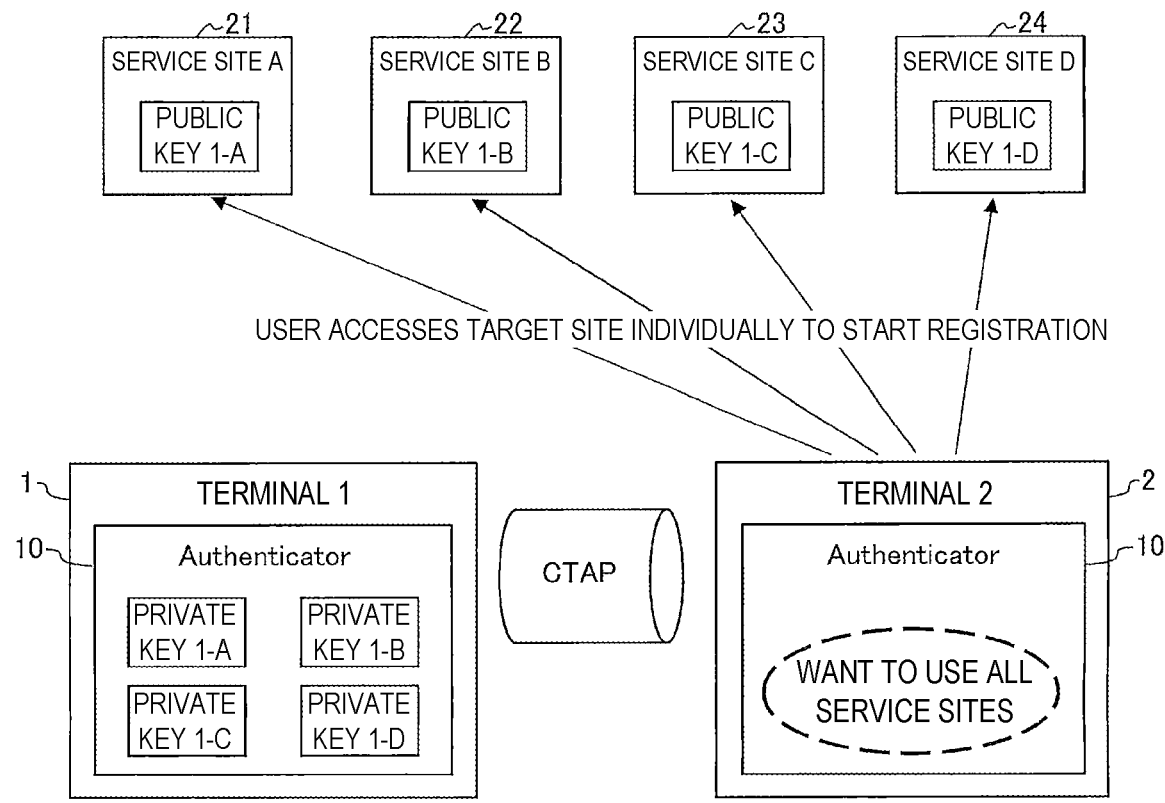
FIG. 13 is a diagram illustrating a problem in achieving available states for multiple service sites.

As indicated by reference sign g in FIG. 8, the user of the terminal is notified of "registration start" and that the number of registration target sites is "3" as the progress status. This notification is displayed, for example, on a display screen of the terminal in the notification field of the application (App). In this example, "REGISTRATION START" and "TARGET: 3, COMPLETED: 0, FAILED: 0" are displayed.

The Registration Manager 100 performs Registration using the registered terminal 1 or the new terminal 2 as an external Authenticator by the CTAP for each service site.

In other words, the Registration Manager 100 outputs a FIDO authentication start request to start FIDO authentication for registration with the service site A21 (step S404) and performs the FIDO standard Authentication operation with the registered terminal 1 (step S405). The Registration Manager 100 receives a FIDO authentication result from the service site A21 (step S406).

Then, the Registration Manager 100 outputs a FIDO authentication registration request to the service site A21 to start FIDO authentication registration (step S407) and performs the FIDO standard Registration operations with the new terminal 2 (step S408). The Registration Manager 100 receives a FIDO authentication registration result from the service site A21 (step S409).

Note that, the FIDO standard Authentication operation and the FIDO standard Registration operation are described in detail with reference to FIG. 3, FIG. 5, and FIG. 7.

Once registration on the service site A21 has been completed, the Registration Manager 100 notifies the user of the update of the registration progress status (step S410).

As indicated by reference sign h in FIG. 8, "REGISTRATION PROGRESS" and "TARGET: 3, COMPLETED: 1, FAILED: 0" are displayed on the terminal as the progress status for the user.

Hereinafter, similarly, the Registration Manager 100 outputs a FIDO authentication start request to start FIDO authentication for registration with the service site B22 (step S411).

However, the FIDO authentication start request issued by the Registration Manager 100 has not reached the service site B22 (see reference sign i and X mark in FIG. 8). It is assumed that the FIDO authentication start request has not reached the service site B22 due to a communication failure or the like.

As indicated by reference sign j in FIG. 8, in a case where there is no response from the service site B22, the Registration Manager 100 performs a first retry after a certain period of time.

The Registration Manager 100 again transmits a FIDO authentication start request to the service site B22 (step S412).

The retry is successful in transmitting the FIDO Authentication start request to the service site B22, and the FIDO standard authentication operation is performed with the registered terminal 1 (step S413). The Registration Manager 100 receives a FIDO authentication result from the service site B22 (step S414).

Then, the Registration Manager 100 outputs a FIDO authentication registration request to the service site B22 to start FIDO authentication registration (step S415) and performs the FIDO standard Registration operations with the new terminal 2 (step S416). The Registration Manager 100 receives a FIDO authentication registration result from the service site B22 (step S417).

Once registration on the service site B22 is completed, the Registration Manager 100 notifies the user of the update of the registration progress status (step S418).

As indicated by reference sign k in FIG. 8, "REGISTRATION PROGRESS" and "TARGET: 3, COMPLETED: 2, FAILED: 0" are displayed on the terminal as the progress status for the user.

Next, the Registration Manager 100 outputs a FIDO authentication start request to start FIDO authentication for registration with the service site C23 (step S419).

However, the FIDO authentication start request issued by the Registration Manager 100 has not reached the service site C23 (see reference sign 1 and X mark in FIG. 8). At this stage, it is assumed that the FIDO authentication start request has not reached the service site C23 due to a communication failure or the like.

As indicated by reference sign m in FIG. 8, in a case where there is no response from the service site C23, the Registration Manager 100 performs a first retry after a certain period of time.

The Registration Manager 100 transmits a FIDO authentication start request to the service site C23 in the first retry (step S420).

The FIDO authentication start request for the service site C23 by the first retry has not reached the service site C23 (see reference sign n and X mark in FIG. 8). As indicated by reference sign o in FIG. 8, in a case where there is no response from the service site C23, the Registration Manager 100 performs a second retry after a certain period of time.

The Registration Manager 100 transmits a FIDO authentication start request to the service site C23 in the second retry (step S421).

The FIDO authentication start request for the service site C23 has not reached the service site C23 even on the second retry (see reference sign p and X mark in FIG. 8). In this case, it is assumed that there is a severe communication failure or that the service site C23 is not connected to the network.

As indicated by reference sign q in FIG. 8, the Registration Manager 100 determines registration failure to the service site C23 after a certain number of retries (two times here), and terminates the registration processing to the service site C23.

The Registration Manager 100 notifies the registration termination on the service site C23 (registration failure) (step S422).

As indicated by reference sign r in FIG. 8, "REGISTRATION COMPLETION" and "TARGET: 3, COMPLETED: 2, FAILED: 1" are displayed on the terminal as the progress status for the user. In this case, as illustrated by reference sign s in FIG. 8, it is more preferable to specify a service site that failed in registration. For example, the URL of the registration failed service site C23 is displayed.

Thus, by the Registration Manager 100 notifying the user of the registration progress status to each service site, the user can confirm the registration progress status for service sites (the number of target sites, the number of registration completion, registration failure). Unauthorized sites can also be identified by specifying invalid sites.

In a case where registration on each service site fails, the Registration Manager 100 may perform retry control to perform a predetermined number of retries, thereby increasing the possibility of connection by retry when registration on a certain service site fails due to a communication failure or the like. By providing the number of retry times, it is possible to reduce access time in a case where the connectivity is low (or there is no connectivity).

Note that, among the processes described in the above-described embodiments, all or some of the processes described as being performed automatically can be performed manually. Alternatively, all or some of the processes described as being manually performed can be performed automatically in a known manner. In addition, the processing procedures, control procedures, specific names, and information including various types of data and parameters illustrated in the specification and drawings can be modified as desired, except as otherwise described. The components of each of the illustrated devices are functional and conceptual, and are not necessarily physically configured as illustrated in the drawings. That is, the specific form of distribution and integration of respective devices is not limited to that illustrated in the drawings, and all or some of them can be configured to be functionally or physically distributed or integrated in any unit, depending on various loads, usage conditions, and the like.

Each of the above-described configurations, functions, processing units, processing means, and the like may be implemented in hardware by designing some or all of these components, for example, in an integrated circuit. Each of the above-described configurations, functions, and the like may be implemented in software for the processor to interpret and execute a program that implements the respective functions. Information such as programs, tables, files, and the like that implement each function can be held in a recording device such as a memory, a hard disk, and a Solid State Drive (SSD), or a recording medium such as an Integrated Circuit (IC) card, a Secure Digital (SD) card, an optical disk, or the like.

The invention claimed is:

1. A terminal registration system, comprising one or more computers, in which a plurality of terminals performing Fast IDentity Online (FIDO) authentication using private keys are communicatively connected to a service site utilized by the plurality of terminals, and a new terminal is registered on a plurality of service sites using a registered terminal, the registered terminal including service site list information that associates the private keys and uniform resource locators (URLs) for access to the plurality of service sites with each other in an Authenticator, the terminal registration system comprising a registration function unit, located at an external device separate from the registered terminal and the new terminal, configured to:
   establish, with a first authenticator of the registered terminal, a first client to authenticator protocol (CTAP);
   establish, with a second authenticator of the new terminal, a second CTAP;
   acquire, from the first authenticator of the registered terminal, the service site list information to perform FIDO authentication to log in to each service site using the registered terminal as an external authenticator, based on the service site list information; and
   for each service site in the acquired service site list:
      transmit a DNS query associated with the service site for a registration endpoint to a DNS server;
      receive the registration endpoint from the DNS server for the service site;
      access the registration endpoint on a web server;
      obtain, from the web server, a FIDO authentication request;
      transmit the FIDO authentication request to the registered terminal;
      in response, receive, from the registered terminal, a FIDO authentication response signed with a private key;
      establish a TLS session to the web server to complete the FIDO authentication using the registered terminal; and
      in response to completing the FIDO authentication using the registered terminal, perform another FIDO authentication using the new terminal.

2. The terminal registration system according to claim 1, wherein:
   the registration function unit notifies a user of a registration progress status for each service site.

3. The terminal registration system according to claim 1, wherein:
   the registration function unit performs retry control for performing a predetermined number of retries in a case where registration on each service site fails.

4. A terminal registration method for a terminal registration system in which a plurality of terminals performing Fast IDentity Online (FIDO) authentication using private keys are communicatively connected to a service site utilized by the plurality of terminals, and a new terminal is registered on a plurality of service sites using a registered terminal, the registered terminal including service site list information that associates the private keys and uniform resource locators (URLs) for access to the plurality of service sites with each other in an Authenticator,
   the terminal registration method comprising:
      establishing, by the registration function unit and with a first authenticator of the registered terminal, a first client to authenticator protocol (CTAP);
      establishing, by the registration function unit and with a second authenticator of the new terminal, a second CTAP;
      acquiring, by the registration function unit and from the first authenticator of the registered terminal, the service site list information to perform FIDO authentication for a registration target service site using the registered terminal as an external authenticator, based on the service site list information;
      for each service site in the acquired service site list:
         transmitting a DNS query associated with the service site for a registration endpoint to a DNS server;
         receiving the registration endpoint from the DNS server for the service site;
         accessing the registration endpoint on a web server;
         obtaining, from the web server, a FIDO authentication request;
         transmitting the FIDO authentication request to the registered terminal;
         in response, receiving, from the registered terminal, a FIDO authentication response signed with a private key;
         establishing a TLS session to the web server to complete the FIDO authentication using the registered terminal; and
         in response to completing the FIDO authentication using the registered terminal, performing another FIDO authentication using the new terminal.

5. The terminal registration system of claim 1, wherein performing the other FIDO authentication using the new terminal comprises:
   obtain, from the web server, another FIDO authentication request;
   transmit the other FIDO authentication request to the new terminal;
   in response, receive, from the new terminal, another FIDO authentication response signed with another private key; and establish another TLS session to the web server to complete the FIDO authentication using the new terminal.

6. The terminal registration method of claim 4, wherein performing the other FIDO authentication using the new terminal comprises:
  obtaining, from the web server, another FIDO authentication request;
  transmitting the other FIDO authentication request to the new terminal;
  in response, receiving, from the new terminal, another FIDO authentication response signed with another private key; and
  establishing another TLS session to the web server to complete the FIDO authentication using the new terminal.

* * * * *